United States Patent
Yang

(10) Patent No.: US 8,696,504 B2
(45) Date of Patent: Apr. 15, 2014

(54) DUAL POWER DRIVING SYSTEM WITH EPICYCLE GEAR SETS TRANSMITTED IN SERIES

(76) Inventor: Tai-Her Yang, Dzan-Hwa (TW)

(*) Notice: Subject to any disclaimer, the term of this patent is extended or adjusted under 35 U.S.C. 154(b) by 0 days.

(21) Appl. No.: 13/295,139

(22) Filed: Nov. 14, 2011

(65) Prior Publication Data
US 2012/0178566 A1    Jul. 12, 2012

Related U.S. Application Data

(63) Continuation-in-part of application No. 12/986,321, filed on Jan. 7, 2011, now Pat. No. 8,414,435.

(51) Int. Cl.
*F16H 3/72* (2006.01)
(52) U.S. Cl.
USPC ................. 475/5; 475/13; 475/150; 475/220
(58) Field of Classification Search
USPC ........................................ 475/5, 13, 150, 220
See application file for complete search history.

(56) References Cited

U.S. PATENT DOCUMENTS

| | | | |
|---|---|---|---|
| 2011/0230294 A1* | 9/2011 | Yang | 475/150 |
| 2012/0174705 A1* | 7/2012 | Yang | 74/665 A |
| 2012/0220404 A1* | 8/2012 | Yang | 475/13 |
| 2012/0231911 A1* | 9/2012 | Yang | 475/4 |
| 2012/0231912 A1* | 9/2012 | Yang | 475/4 |
| 2012/0232729 A1* | 9/2012 | Yang | 701/22 |

* cited by examiner

*Primary Examiner* — Derek D Knight
(74) *Attorney, Agent, or Firm* — Bacon & Thomas, PLLC

(57) ABSTRACT

The present invention provides a dual power driving system with epicycle gear sets transmitted in series, in which the input shaft, the output shaft and the controllable brake device of each epicycle gear set can be coaxially connected in series, or connected in parallel or not in parallel; the rotating shaft at the output end and the rotating shaft at the input end of each epicycle gear set can be directly connected, or an intermediate transmission device can be installed for connection, and through operating the controllable brake devices to choose the structural configurations of the dual power driving system.

19 Claims, 10 Drawing Sheets

DUAL POWER DRIVING SYSTEM WITH EPICYCLE GEAR SETS TRANSMITTED IN SERIES

CROSS-REFERENCE TO RELATED APPLICATION

This application is a Continuation-In-Part of my patent application Ser. No. 12/986,321, filed on Jan. 7, 2011 now U.S. Pat. No. 8,414,435.

BACKGROUND OF THE INVENTION (a) Field of the Invention

The present invention provides a dual power driving system with epicycle gear sets transmitted in series, in which the input shaft, the output shaft and the controllable brake device of each epicycle gear set can be coaxially connected in series, or connected in parallel or not in parallel; the rotating shaft at the output end and the rotating shaft at the input end of each epicycle gear set can be directly connected, or an intermediate transmission device can be installed for connection, and through operating the controllable brake devices, the selections for the structural configurations of the dual power driving system are more variously than that of the conventional clutch devices driven by electromagnetic, pneumatic, oil pressure, or mechanics.

(b) Description of the Prior Art

A conventional dual power driving system usually utilizes an electromagnetic driven, pneumatic driven, oil pressure driven or mechanical driven clutch device for switching and controlling the operation modes, and one disadvantage thereof is that the matched clutch is often large in volume so the space utility is limited.

SUMMARY OF THE INVENTION

The present invention provides a dual power driving system with epicycle gear sets transmitted in series, in which the input end of a first epicycle gear set is connected to a first rotary kinetic energy source, and the output end of the first epicycle gear set and the input end of a second epicycle gear set are connected for transmission, and a rocker arm of epicycle wheel of the second epicycle gear set is connected to a second rotary kinetic energy source through a transmission device, and the output end of the second epicycle gear set is served to drive a carrier; through installing a controllable brake device between the input end of the first epicycle gear set and a housing, and installing a controllable brake device between the output end of the first epicycle gear set and the housing, and installing a controllable brake device between the second rotary kinetic energy source and the rocker arm driven by the epicycle wheel of the second epicycle gear set as well as between any rotary unit of the transmission device and the housing, the operation modes of the dual power driving system can be controlled through operating and controlling the controllable brake devices.

Figure 1:
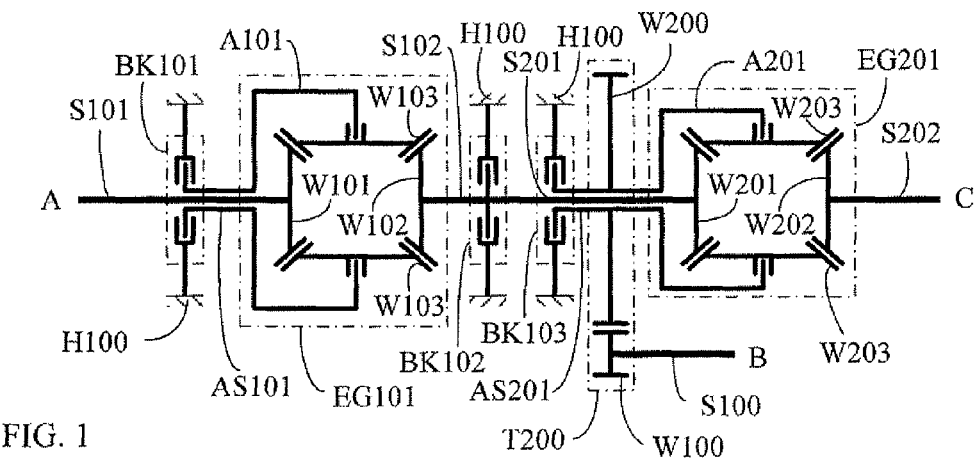
FIG. 1 is a schematic view showing the main structural components and system configuration according to the present invention.

DESCRIPTION OF MAIN COMPONENT SYMBOLS (A): First rotary kinetic energy source
(B): Second rotary kinetic energy source
(C): Carrier
(A101), (A201): Rocker arm
(AS101), (AS201): Rocker arm sleeve
(BK101), (BK102), (BK103), (BK104): Controllable brake device
(EG101): First epicycle gear set
(EG201): Second epicycle gear set
(EM100): Electric machine
(EM101): Static part of electric machine
(EM102): Rotary part of electric machine
(H100): Housing
(S100), (S101), (S102), (S201), (S202): Rotating shaft
(T100), (T200): Transmission device
(W100), (W101), (W102), (W200), (W201), (W202): Transmission wheel
(W103), (W203): Epicycle wheel

DETAILED DESCRIPTION OF THE PREFERRED EMBODIMENTS

The present invention provides a dual power driving system with epicycle gear sets transmitted in series, in which the input shaft, the output shaft and the controllable brake device of each epicycle gear set can be coaxially connected in series, or connected in parallel or not in parallel; the rotating shaft at the output end and the rotating shaft at the input end of each epicycle gear set can be directly connected, or an intermediate transmission device can be installed for connection, and through operating the controllable brake devices, the selections for the structural configurations of the dual power driving system are more variously than that of the conventional clutch devices driven by electromagnetic, pneumatic, oil pressure, or mechanics.

The present invention provides a dual power driving system with epicycle gear sets transmitted in series, in which the input end of a first epicycle gear set is connected to a first rotary kinetic energy source, and the output end of the first epicycle gear set and the input end of a second epicycle gear set are connected for transmission, and a rocker arm of epicycle wheel of the second epicycle gear set is connected to a second rotary kinetic energy source through a transmission device, and the output end of the second epicycle gear set is served to drive a carrier; through installing a controllable brake device between the input end of the first epicycle gear set and a housing, and installing a controllable brake device between the output end of the first epicycle gear set and the housing, and installing a controllable brake device between the second rotary kinetic energy source and the rocker arm driven by the epicycle wheel of the second epicycle gear set as well as between any rotary unit of the transmission device and the housing, the operation modes of the dual power driving system can be controlled through operating and controlling the controllable brake devices.

For the dual power driving system with epicycle gear sets transmitted in series of the present invention, in which the device served to generate rotary kinetic energy through input is structured by the internal combustion engine, the external combustion engine, the turbine engine, the Stirling engine, the power generator, the machinery having electromotive or power generation functions, the wind turbine, the liquid flow turbine or the manually driven device; and the first rotary kinetic energy source (A) and the second rotary kinetic energy source (B) are constituted by one or more than one of the above mentioned machineries for driving the carrier (C), which includes a vehicle, a boat, or a fly carrier or agricultural machinery, or an engineer or industry machinery or an energy equipment;

The main components and operation theories of the dual power driving system with epicycle gear sets transmitted in series according to the present invention are disclosed as follows.

Figure 2:
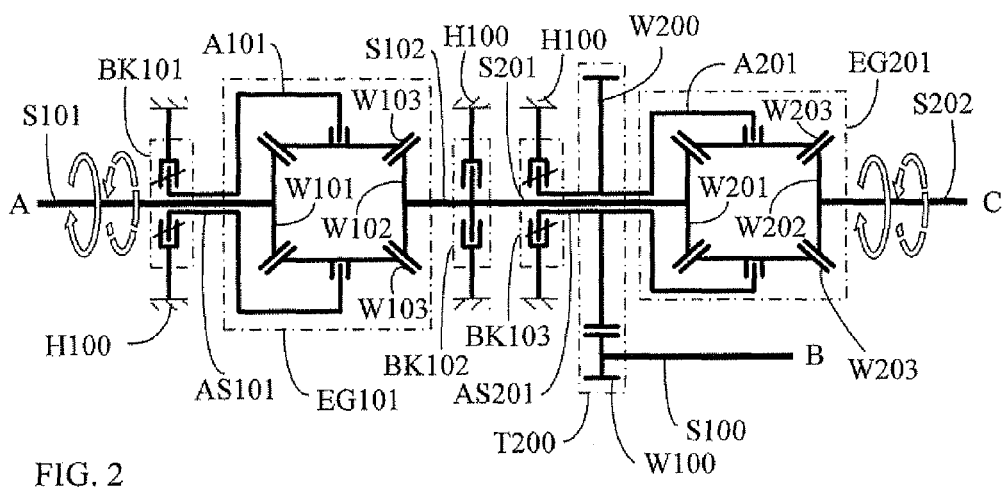
FIG. 2 is a schematic view showing the operation state wherein the rotary kinetic energy is inputted from the first rotary kinetic energy source (A) for driving the carrier (C).
Figure 3:
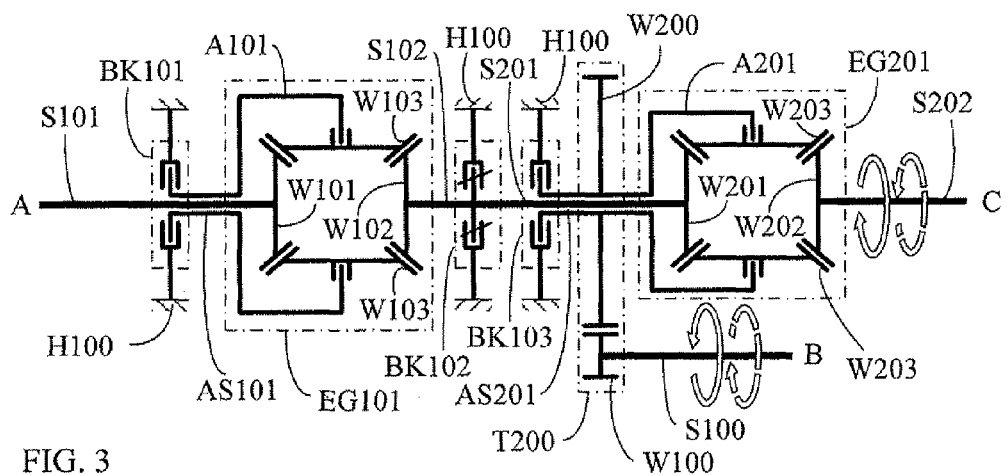
FIG. 3 is a schematic view showing the operation state wherein the rotary kinetic energy is inputted from the second rotary kinetic energy source (B) for driving the carrier (C).
Figure 4:
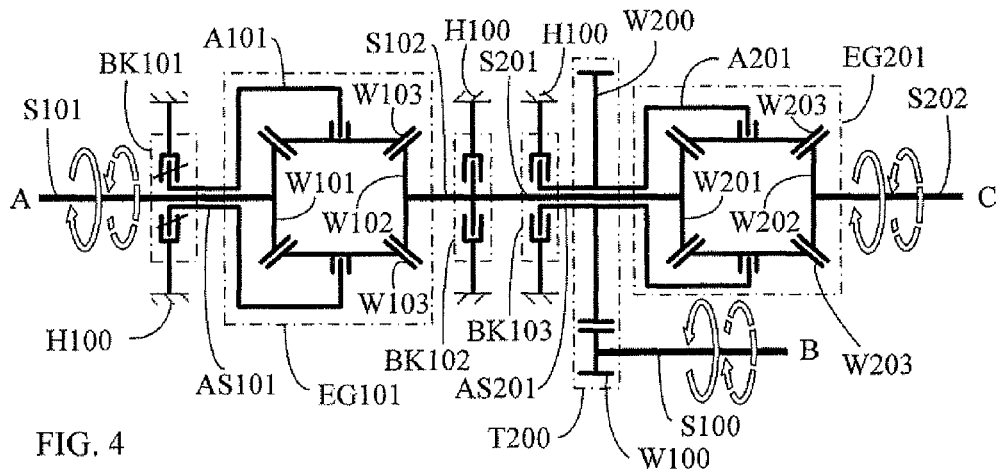
FIG. 4 is a schematic view showing the operation state wherein the rotary kinetic energy is inputted from the first rotary kinetic energy source (A) for driving the second rotary kinetic energy source (B) and the carrier (C).
Figure 5:
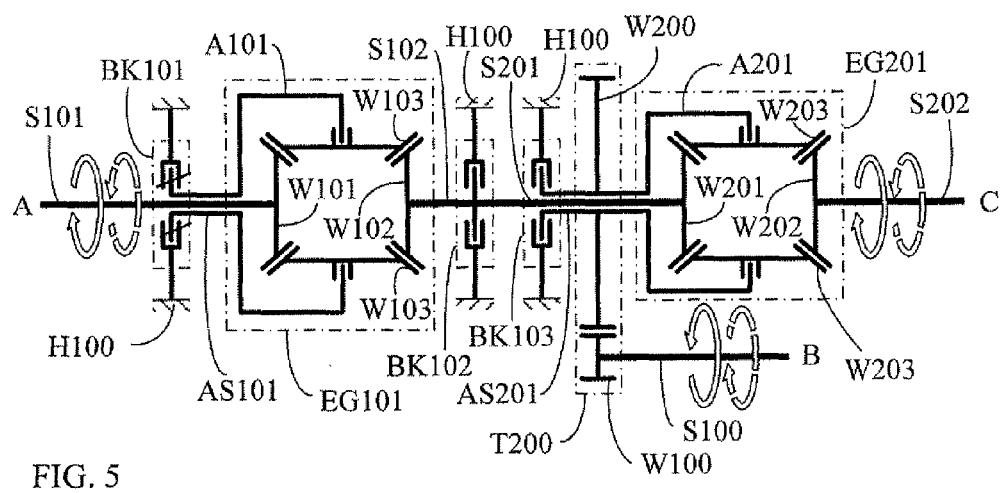
FIG. 5 is a schematic view showing the operation state wherein the rotary kinetic energy is inputted from both the first rotary kinetic energy source (A) and the second rotary kinetic energy source (B) for driving the carrier (C) together.
Figure 6:
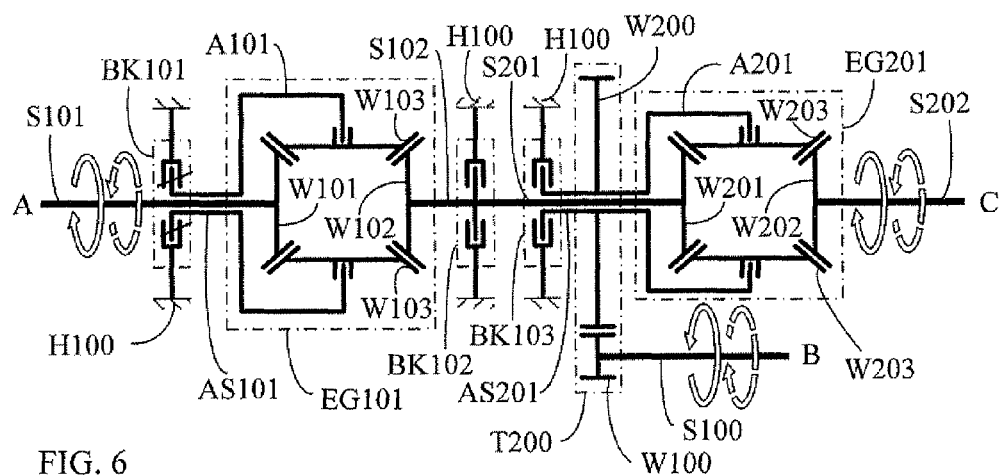
FIG. 6 is a schematic view showing the operation state wherein the rotary kinetic energy is inputted from the second rotary kinetic energy source (B) for driving the first rotary kinetic energy source (A) and the carrier (C).
Figure 7:
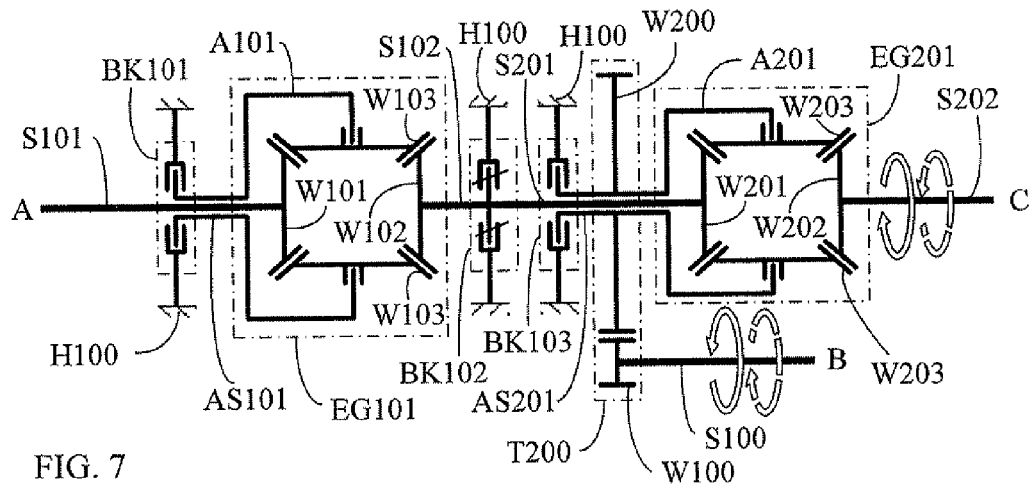
FIG. 7 is a schematic view showing the operation state wherein the rotary kinetic energy is reversely inputted from the carrier (C) for driving the second rotary kinetic energy source (B).
Figure 8:
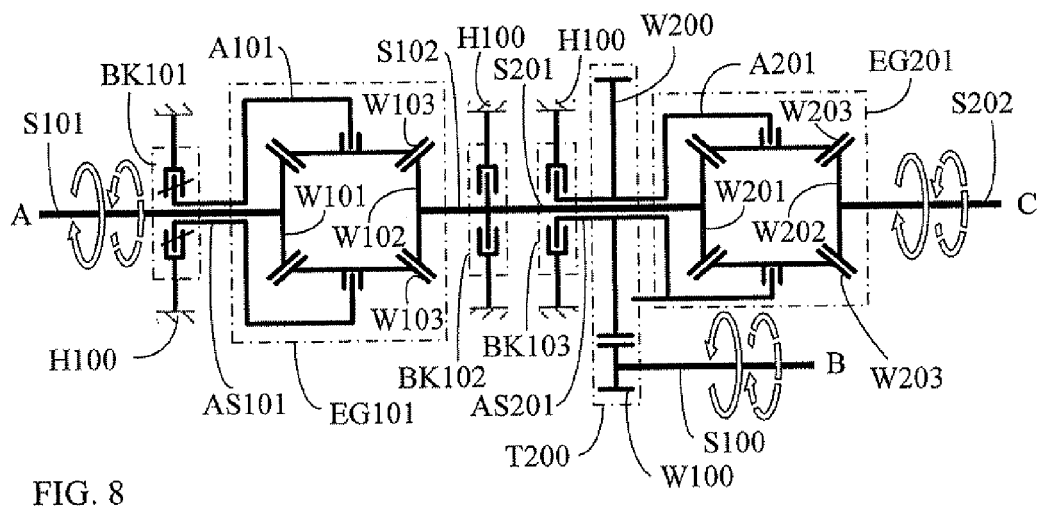
FIG. 8 is a schematic view showing the operation state wherein the rotary kinetic energy is reversely transmitted from the carrier (C) for driving the first rotary kinetic energy source (A) and the second rotary kinetic energy source (B).
Figure 9:
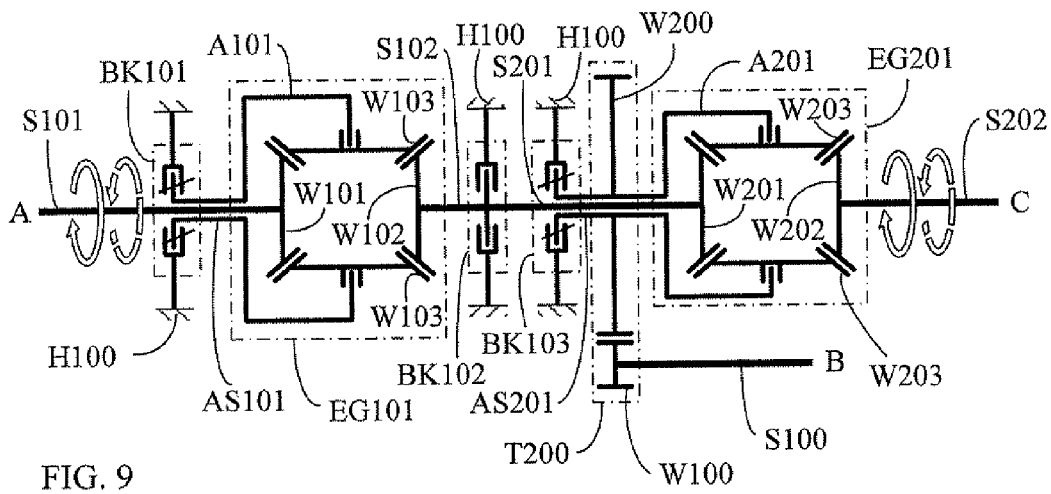
FIG. 9 is a schematic view showing the operation state wherein the rotary kinetic energy is reversely transmitted from the carrier (C) for driving the first rotary kinetic energy source (A).
Figure 10:
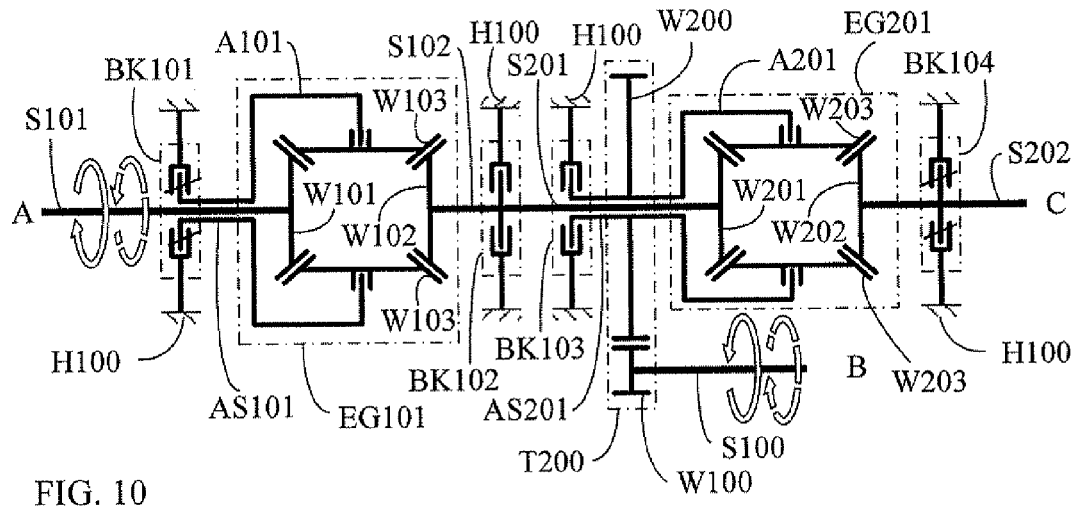
FIG. 10 is a schematic view showing the operation state wherein the rotating shaft (S202) at the output end of the second epicycle gear set (EG201) is further installed with a controllable brake device (BK104), and the first rotary kinetic energy source (A) is driven by the rotary kinetic energy of the second rotary kinetic energy source (B), according to the present invention.
Figure 11:
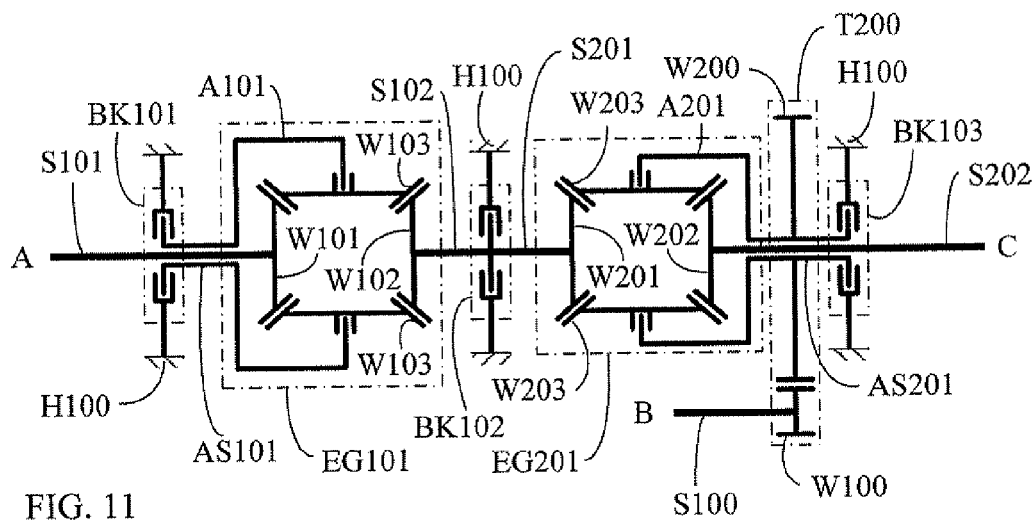
FIG. 11 is a schematic view showing that the transmission wheel (W200), the transmission wheel (W100), the rocker arm sleeve (AS201), the rocker arm (A201) and the controllable brake device (BK103) are installed at the output end of the second epicycle gear set (EG201), according to the present invention.
Figure 12:
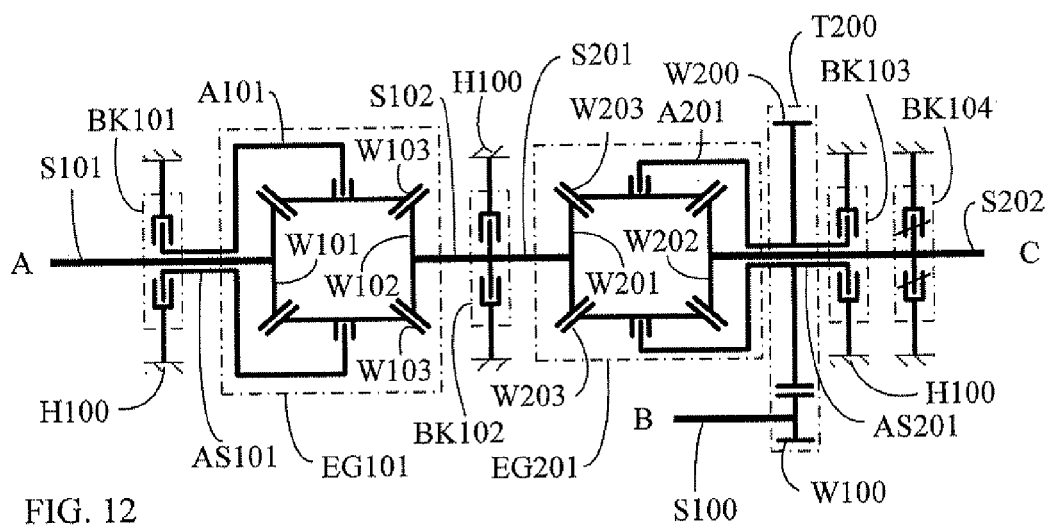
FIG. 12 is a schematic view showing the operation state wherein the rotating shaft (S202) at the output end of the second epicycle gear set (EG201) as shown in FIG. 11 is further installed with a controllable brake device (BK104), and the first rotary kinetic energy source (A) is driven by the rotary kinetic energy of the second rotary kinetic energy source (B).
Figure 13:
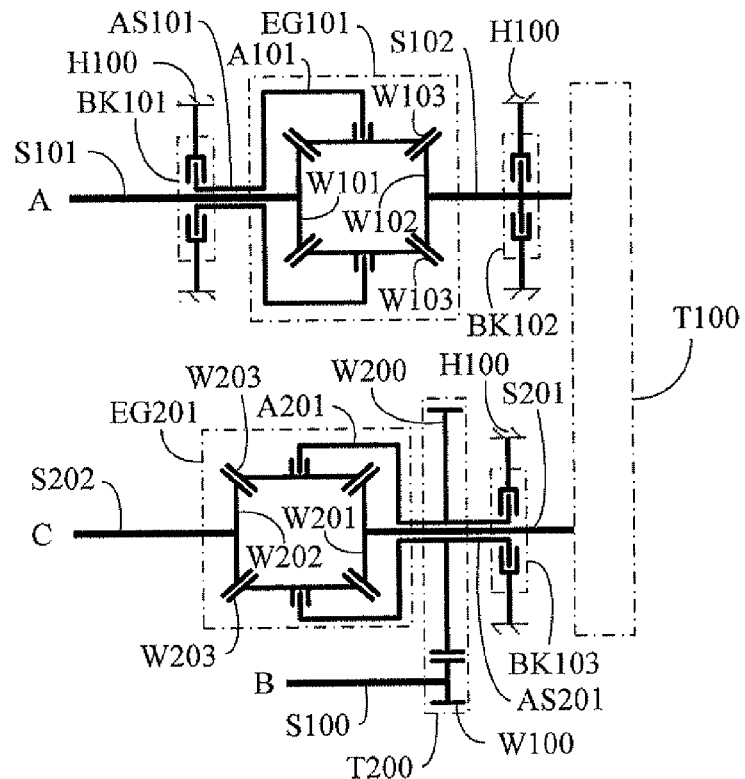
FIG. 13 is a schematic view showing that the first epicycle gear set (EG101) and the second epicycle gear set (EG201) are arranged in parallel, and the transmission device (T100) is installed between the rotating shaft (S102) and the rotating shaft (S201).
Figure 14:
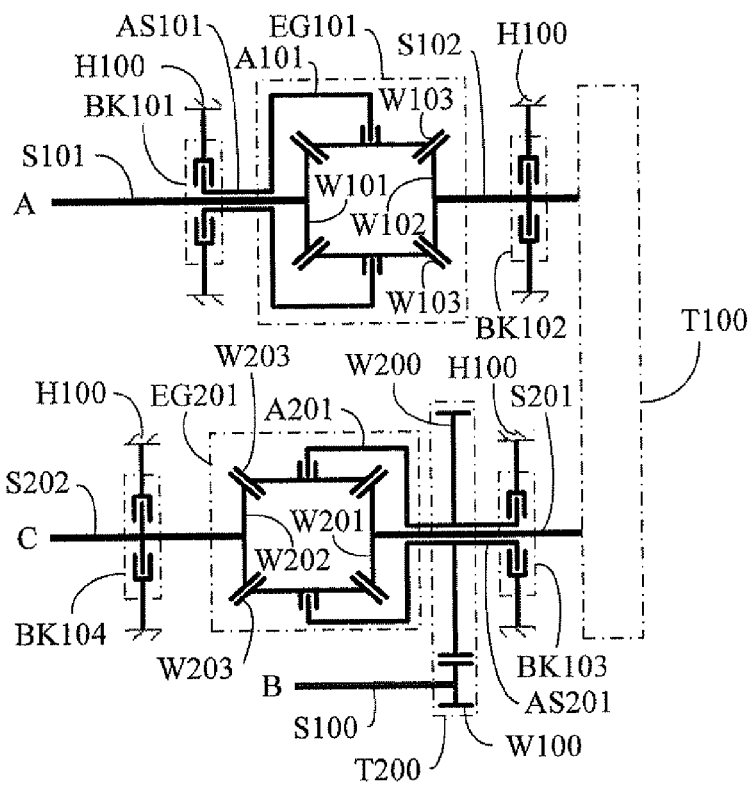
FIG. 14 is a schematic view showing the operation state wherein the rotating shaft (S202) at the output end of the second epicycle gear set (EG201) as shown in FIG. 13 is further installed with a controllable brake device (BK104), and the first rotary kinetic energy source (a) is driven by the rotary kinetic energy of the second rotary kinetic energy source (B).

Referring to FIG. 1, which is a schematic view showing the main structural components and system configuration according to the present invention;

As shown in FIG. 1, it mainly consists of:

First epicycle gear set (EG101): a transmission wheel (W101) at the input end, an epicycle wheel (W103), a transmission wheel (W102) at the output end are served to constitute the first epicycle gear set (EG101), wherein the mentioned wheels are gears or friction wheels; a rotating shaft (S101) is installed at the input end, one end of the rotating shaft (S101) is driven by the first rotary kinetic energy source (A), the other end thereof is connected to the transmission wheel (W101) at the input end, and a rotating shaft (S102) is installed at the output end for connecting to the transmission wheel (W102) at the output end, and one or more than one of epicycle wheels (W103) are installed between the transmission wheel (W101) and the transmission wheel (W102), the epicycle wheel (W103) is equipped with a rocker arm (A101) and a rocker arm sleeve (AS101), the rocker arm sleeve (AS101) is served to shaft-installed on both or at least one of the rotating shafts (S101, S102) and capable of performing relative rotation; a controllable brake device (BK101) is installed between the rocker arm (A101) and the rocker arm sleeve (AS101) and a housing (H100);

Second epicycle gear set (EG201): a transmission wheel (W201) at the input end, an epicycle wheel (W203), a transmission wheel (W202) at the output end are served to constitute the second epicycle gear set (EG201), wherein the mentioned wheels are gears or friction wheels; a rotating shaft (S201) is installed at the input end, one end of the rotating shaft (S201) is connected to the rotating shaft (S102) at the output end of the first epicycle gear set (EG101) for transmission, the other end thereof is connected to the transmission wheel (W201) at the input end, and a rotating shaft (S202) is installed at the output end, one end of the rotating shaft (S202) is connected to the transmission wheel (W202) at the output end, the other end thereof is connected to a carrier (C), one or more than one of epicycle wheels (W203) are installed between the transmission wheel (W201) and the transmission wheel (W202), the epicycle wheel (W203) is equipped with a rocker arm (A201) and a rocker arm sleeve (AS201), the rocker arm sleeve (AS201) is shaft-installed on both or at least one of the rotating shafts (S201, S202) and capable of performing relative rotation; a controllable brake device (BK103) is installed between the rocker arm (A201) and the rocker arm sleeve (AS201) and the housing (H100), and a controllable brake device (BK102) is installed between the rotating shaft (S201) and the housing (H100);

Controllable brake device (BK101), (BK102), (BK103): constituted by a brake device driven through manual force, mechanical force, pneumatic force, hydraulic force or electromagnetic effect, for being controlled to perform operations of engagement braking or releasing, and the operation means can be engagement braking in a normal state and be releasing in an input control state, or can be releasing in the normal state and be engagement braking in the input control state;

Transmission device (T200): constituted by the transmission device including automatic transmission, manumatic transmission, semi-automatic transmission, or manual transmission with fixed speed ratio or variable speed ratio, which is structured by the transmission wheel train, or planetary transmission wheel train, or the epicycle wheel train, or the CVT, or the liquid force transmission device, which is composed of gears, friction wheels, belts and pulleys, chains and chain wheels;

Housing (H100): constituted by a static housing for accommodating the first epicycle gear set (EG101), the second epicycle gear set (EG201), the controllable brake device (BK101), the controllable brake device (BK102) and the controllable brake device (BK103), and is connected to the first rotary kinetic energy source (A), the second rotary kinetic energy source (B) and the carrier (C);

The rotating shaft (S101) at the input end of the first epicycle gear set (EG101) is connected to the first rotary kinetic energy source (A);

The rotating shaft (S202) at the output end of the second epicycle gear set (EG201) is connected to the carrier (C);

The transmission wheel (W200) of the transmission device (T200) is connected to the rocker arm (A201) and the rocker arm sleeve (AS201) of the second epicycle gear set (EG201), and is served to connect with the second rotary kinetic energy source (B) via the transmission wheel (W100) and the rotating shaft (S100) which are transmitted for transmission;

The epicycle wheel (W103) of the first epicycle gear set (EG101) is shaft-installed to both or at least one of the rotating shafts (S101), (S102) through the rocker arm (A101) and the rocker arm sleeve (AS101), and capable of rotating along the rotating shaft;

The controllable brake device (BK101) is installed between the rocker arm sleeve (AS101) and the rocker arm (A101) of the first epicycle gear set (FG101) and the housing (H100);

The rotating shaft (S102) at the output end of the first epicycle gear set (EG101) and the rotating shaft (S201) at the input end of the second epicycle gear set (EG201) are connected for transmission;

The controllable brake device (BK102) is installed between the rotating is shaft (S201) and the housing (H100);

The epicycle wheel (W203) of the second epicycle gear set (EG201) is sleeved to both or at least one of the rotating shafts (S201), (S202) through the rocker arm (A201) and the rocker arm sleeve (AS201), and capable of rotating along the rotating shaft;

The controllable brake device (BK103) is installed between the rocker arm sleeve (AS201) and the rocker arm (A201) of the second epicycle gear set (EG201) and the housing (H100); the rocker arm sleeve (AS201) and the rocker arm (A201) are connected to the transmission wheel (W200) of the transmission device (T200);

According to the present invention, the operation functions of the dual power driving system with epicycle gear sets transmitted in series has one or more than one of the followings:

(1) The controllable brake devices (BK101), (BK103) are in the engagement braking state; the first rotary kinetic energy source (A) inputs the rotary kinetic energy for driving the rotating shaft (S101), and then the rotary kinetic energy is transmitted through the rotating shaft (S102) at the output end of the first epicycle gear set (EG101) and the connected rotating shaft (S201) at the input end of the second epicycle gear set (EG201), and further through the rotating shaft (S202) at the output end of the second epicycle gear set (EG201) so as to drive the carrier (C); FIG. 2 is a schematic view showing the operation state wherein the rotary kinetic energy is inputted from the first rotary kinetic energy source (A) for driving the carrier (C);

(2) The controllable brake device (BK102) is in the engagement braking state; the second rotary kinetic energy source (B) inputs the rotary kinetic energy for driving the rotating shaft (S100) and the transmission wheel (W100) of the transmission device (T200), and then the rotary kinetic energy is transmitted through the transmission wheel (W200) of the transmission device (T200) and the rocker arm sleeve (AS201) and the rocker arm (A201) to allow the epicycle wheel (W203) to epicycle on the transmission wheel (W201), and meanwhile to drive the transmission wheel (W202) and the rotating shaft (S202) at the output end so as to drive the carrier (C); FIG. 3 is a schematic view showing the operation state wherein the rotary kinetic energy is inputted from the second rotary kinetic energy source (B) for driving the carrier (C);

(3) The controllable brake device (BK101) is in the engagement braking state; the first rotary kinetic energy source (A) inputs the rotary kinetic energy for driving the rotating shaft (S101), and then the rotary kinetic energy is transmitted through the rotating shaft (S102) at the output end of the first epicycle gear set (EG101) and the connected rotating shaft (S201) at the input end of the second epicycle gear set (EG201), and further through the rotating shaft (S202) at the output end of the second epicycle gear set (EG201) to drive the carrier (C), and meanwhile through the epicycle wheel (W203) of the second epicycle gear set (EG201) and the rocker arm (A201) and the rocker arm sleeve (AS201) and the transmission wheel (W200) of the transmission device (T200) to drive the transmission wheel (W100) and the rotating shaft (S100) so as to drive the second rotary kinetic energy source (B); FIG. 4 is a schematic view showing the operation state wherein the rotary kinetic energy is inputted from the first rotary kinetic energy source (A) for driving the second rotary kinetic energy source (B) and the carrier (C);

(4) The controllable brake device (BK101) is in the engagement braking state; the first rotary kinetic energy source (A) inputs the rotary kinetic energy for driving the rotating shaft (S101), and then the rotary kinetic energy is transmitted through the rotating shaft (S102) at the output end of the first epicycle gear set (EG101) and the connected rotating shaft (S201) at the input end of the second epicycle gear set (EG201), and further through the rotating shaft (S202) at the output end of the second epicycle gear set (EG201) to drive the carrier (C), and meanwhile the second rotary kinetic energy source (B) inputs the rotary kinetic energy for driving the rotating shaft (S100), and then the rotary kinetic energy is transmitted through the transmission wheel (W100) and the transmission wheel (W200) of the transmission device (T200) and the rocker arm sleeve (AS201) and the rocker arm (A201) to allow the epicycle wheel (W203) to epicycle on the transmission wheel (W201), and meanwhile to drive the transmission wheel (W202) and the rotating shaft (S202), and thereby to drive the carrier (C) together with the rotary kinetic energy of the first rotary kinetic energy source (A); FIG. 5 is a schematic view showing the operation state wherein the rotary kinetic energy is inputted from both the first rotary kinetic energy source (A) and the second rotary kinetic energy source (B) for driving the carrier (C) together;

(5) The controllable brake device (BK101) is in the engagement braking state; the second rotary kinetic energy source (B) inputs the rotary kinetic energy for driving the rotating shaft (S100), and then the rotary kinetic energy transmits through the transmission wheel (W100) of the transmission device (T200) to drive the transmission wheel (W200) and the rocker arm sleeve (AS201) and the rocker arm (A201) so that the epicycle wheel (W203) is linked to drive the transmission wheel (W202), and thereby through the transmission wheel (W202) to drive the carrier (C), and meanwhile the epicycle wheel (W203) drives the transmission wheel (W201), and through the rotating shaft (S201) and the rotating shaft (S102) and through the transmission wheel (W102) and the epicycle wheel (W103) of the first epicycle gear set (EG101) to drive the transmission wheel (W101) and the rotating shaft (S101), and thereby further to drive the first rotary kinetic energy source (A); FIG. 6 is a schematic view showing the operation state wherein the rotary kinetic energy is inputted from the second rotary kinetic energy source (B) for driving the first rotary kinetic energy source (A) and the carrier (C);

(6) The controllable brake device (BK102) is in the engagement braking state; the carrier (C) reversely inputs the rotary kinetic energy for driving the transmission wheel (W202) of the second epicycle gear set (EG201) through the rotating shaft (S202), so as to drive the epicycle wheel (W203) and the rocker arm (A201) and the rocker arm sleeve (AS201) and the transmission wheel (W200) of the transmission device (T200), and the transmission wheel (W200) of the transmission device (T200) drives the transmission wheel (W100) and then drives the rotating shaft (S100) thereby to drive the second rotary kinetic energy source (B); FIG. 7 is a schematic view showing the operation state wherein the rotary kinetic energy is reversely inputted from the carrier (C) for driving the second rotary kinetic energy source (B);

(7) The controllable brake device (BK101) is in the engagement braking state; the carrier (C) reversely inputs the rotary kinetic energy for driving the transmission wheel (W202) of the second epicycle gear set (EG201) through the rotating shaft (S202), so as to drive the epicycle wheel (W203) and the rocker arm (A201) and the rocker arm sleeve (AS201) and the transmission wheel (W200) of the transmission device (T200), and the transmission wheel (W200) drives the transmission wheel (W100) and the rotating shaft (S100) so as to drive the second rotary kinetic energy source (B); meanwhile the epicycle wheel (W203) drives the transmission wheel (W201) so as to drive the rotating shaft (S201) and the rotating shaft (S102), thereby through the transmission wheel (W102), the epicycle wheel (W103), the transmission wheel (W101) of the first epicycle gear set (EG101) to drive the rotating shaft (S101), and further to drive the first rotary kinetic energy source (A) at the same time; FIG. 8 is a schematic view showing the operation state wherein the rotary kinetic energy is reversely transmitted from the carrier (C) for driving the first rotary kinetic energy source (A) and the second rotary kinetic energy source (B);

(8) The controllable brake devices (BK101), (BK103) are in the engagement braking state; the carrier (C) reversely inputs the rotary kinetic energy for driving the transmission wheel (W202) of the second epicycle gear set (EG201) through the rotating shaft (S202), and then the rotary kinetic energy is transmitted through the epicycle wheel (W203) to drive the transmission wheel (W201), so as to drive the rotating shaft (S201) and the rotating shaft (S102), and further through the transmission wheel (W102) and the epicycle wheel (W103) of the first epicycle gear set (EG101) to drive the transmission wheel (W101), so as to drive the rotating shaft (S101) to further drive the first rotary kinetic energy source (A); FIG. 9 is a schematic view showing the operation state wherein the rotary kinetic energy is reversely transmitted from the carrier (C) for driving the first rotary kinetic energy source (A);

According to the present invention of the dual power driving system with epicycle gear sets transmitted in series, FIG. 10 is a schematic view showing the operation state wherein the rotating shaft (S202) at the output end of the second epicycle gear set (EG201) is further installed with a controllable brake device (BK104), and the first rotary kinetic energy source (A) is driven by the rotary kinetic energy of the second rotary kinetic energy source (B), according to the present invention, in which a controllable brake device (BK104) is further installed between the rotating shaft (S202) at the output end of the second epicycle gear set (E0201) and the housing (H100) for fastening the rotating shaft (S202), and thereby the rotary kinetic energy is inputted from the second rotary kinetic energy source (B) to drive the rotating shaft (S100), and then transmitted through the transmission wheel (W100) of the transmission device (T200) to drive the transmission wheel (W200) and the rocker arm sleeve (AS201), and to rotationally drive the rocker arm (A201), so as to link the epicycle wheel (W203) to drive the transmission wheel (W201), and then transmitted through the rotating shaft (S201) and the rotating shaft (S102) and the transmission wheel (W102) and the epicycle wheel (W103) of the first epicycle gear set (EG101) to drive the transmission wheel (W101) and the rotating shaft (S101), and thereby to drive the first rotary kinetic energy source (A) at the same time; FIG. 10 is a schematic view showing the operation state wherein the rotating shaft (202) at the output end of the second epicycle gear set (EG201) is further installed with a controllable brake device (BK104), and the first rotary kinetic energy source (A) is driven by the rotary kinetic energy of the second rotary kinetic energy source (B), according to the present invention;

According to the dual power driving system with epicycle gear sets transmitted in series of the present invention, FIG. 11 is a schematic view showing that the transmission wheel (W200), the transmission wheel (W100), the rocker arm sleeve (AS201), the rocker arm (A201) and the controllable brake device (BK103) are installed at the output end of the second epicycle gear set (EG201), according to the present invention, in which the rocker arm (A201) and the rocker arm sleeve (AS201) of the second epicycle gear set (EG201) and the transmission wheel (W200) of the transmission device (T200) can be installed on the rotating shaft (S202) at the output end of the second epicycle gear set (EG201);

The dual power driving system with epicycle gear sets transmitted in series as shown in FIG. 11 is further shown as FIG. 12, which is a schematic view showing the operation state wherein the rotating shaft (S202) at the output end of the second epicycle gear set (EG201) as shown in FIG. 11 is further installed with a controllable brake device (BK104), and the first rotary kinetic energy source (A) is driven by the rotary kinetic energy of the second rotary kinetic energy source (B); wherein the rotating shaft (S202) at the output end of the second epicycle gear set (EG201) for installing the rocker arm (A201) and the rocker arm sleeve (AS201) of the second epicycle gear set (EG201) and the transmission wheel (W200) of the transmission device (T200) can be further installed with a controllable brake device (BK104); the structure is that the controllable brake device (BK104) is installed between the rotating shaft (S202) at the output end of the second epicycle gear set (EG201) and the housing (H100) for fastening the rotating shaft (S202), and thereby the rotary kinetic energy is inputted from the second rotary kinetic energy source (B) to drive the rotating shaft (S100), and then transmitted through the transmission wheel (W100) of the transmission device (T200) to drive the transmission wheel (W200) and the rocker arm sleeve (AS201), and to rotationally drive the rocker arm (A201), so as to link the epicycle wheel (W203) to drive the transmission wheel (W201), and then transmitted through the rotating shaft (S201) and the rotating shaft (S102) and the transmission wheel (W102) and the epicycle wheel (W103) of the first epicycle gear set (EG101) to drive the transmission wheel (W101) and the rotating shaft (S101), and thereby to drive the first rotary kinetic energy source (A) at the same time;

According to the present invention of the dual power driving system with epicycle gear sets transmitted in series, FIG. 13 is a schematic view in showing that the first epicycle gear set (EG101) and the second epicycle gear set (EG201) are arranged in parallel, and the transmission device (T100) is installed between the rotating shaft (S102) and the rotating shaft (S201), in which the first epicycle gear set (EG101) and the second epicycle gear set (EG201) can further be arranged in parallel and the transmission device (T100) is provided for series transmission, wherein the rotating shaft (S101) at the input end of the first epicycle gear set (EG101) is driven by the first rotary kinetic energy source (A), and the controllable brake device (BK101) is installed between the rotating shaft (S101) and the housing (H100);

The transmission device (T100) is installed between the rotating shaft (S102) and the rotating shaft (S201) at the input end of the second epicycle gear set (EG201), the controllable brake device (BK103) is installed between the rocker arm sleeve (A5201) and the housing (H100), and the rotating shaft (S202) at the output end of the second epicycle gear set (EG201) is served to drive the carrier (C);

Transmission device (T100) is constituted by the transmission device including automatic transmission, manumatic transmission, semi-automatic transmission, or manual transmission with fixed speed ratio or variable speed ratio, which is structured by the transmission wheel train, or planetary transmission wheel train, or the epicycle wheel train, or the CVT, or the liquid force transmission device, which is composed of gears, friction wheels, belts and pulleys, chains and chain wheels;

The epicycle wheel (W203) of the second epicycle gear set (E0201) is connected to the rocker arm (A201) and the rocker aim sleeve (AS201) and the transmission wheel (W200) of the transmission device (T200), and is linked to mutually transmit with the transmission wheel (W100), and thereby to connected with the second rotary kinetic energy source (B) through the rotating shaft (S100);

The controllable brake device (BK102) is installed between the rotating shaft (S102) at the output end of the first epicycle gear set (EG101) and the housing (H100), and the controllable brake device (BK102) can also be installed on the rotating shaft (S201) at the input end of the second epicycle gear set (EG201), the mentioned two installations provide the same function to the system;

According to the embodiment of FIG. 13, FIG. 14 is a schematic view showing the operation state wherein the rotating shaft (S202) at the output end of the second epicycle gear set (EG201) as shown in FIG. 13 is further installed with a controllable brake device (BK104), and the first rotary kinetic energy source (A) is driven by the rotary kinetic energy of the second rotary kinetic energy source (B), in which the controllable brake device (BK104) can be further installed on the rotating shaft (S202) at the output end of the second epicycle gear set (EG201), so as the kinetic energy of the first rotary kinetic energy source (A) can be driven by the second rotary kinetic energy source (B); the structure is that the controllable brake device (BK104) is installed between the rotating shaft (S202) at the output end of the second epicycle gear set (EG201) and the housing (H100) for fastening the rotating shaft (S202), and the rotary kinetic energy is inputted from the second rotary kinetic energy source (B) to drive the rotating shaft (S100), and then transmitted through the transmission wheel (W100) of the transmission device (T200) to drive the transmission wheel (W200) and the rocker arm sleeve (AS201), and to rotationally drive the rocker arm (A201), so as to link the epicycle wheel (W203) to drive the transmission wheel (W201), and then transmitted through the rotating shaft (S201) and the transmission device (T100) and the rotating shaft (S102) and further through the transmission wheel (W102) and the epicycle wheel (W103) of the first epicycle gear set (EG101) to drive the transmission wheel (W101) and the rotating shaft (S101) and thereby to drive the first rotary kinetic energy source (A) at the same time;

According to the present invention of the dual power driving system with epicycle gear sets transmitted in series, the controllable brake device (BK103) is served to control the transmission chain between the second rotary kinetic energy source (B) through the rotating shaft (S100), the transmission device (T200) and the rocker arm (A201) and the epicycle wheel (W203) of the second epicycle gear set (EG201) to be braked or capable of performing rotational driving, so the installation location of the controllable brake device (BK103) can be between the rotary part of the second rotary kinetic energy source (B) and the housing (H100), or between the rotating shaft (S100), the transmission device (T200), the rocker arm (A201) of the rotating component in the mentioned transmission chain and the housing (H100).

According to the present invention of the dual power driving system with epicycle gear sets transmitted in series, the first rotary kinetic energy source (A), the second rotary kinetic energy source (B), the carrier (C), the first epicycle gear set (EG101), the second epicycle gear set (EG201) and each controllable brake device set are installed in the housing (H100) which can be integrally formed as one unit or assembled by plural units, or are installed in two or more or than two of independent housings.

Figure 15:
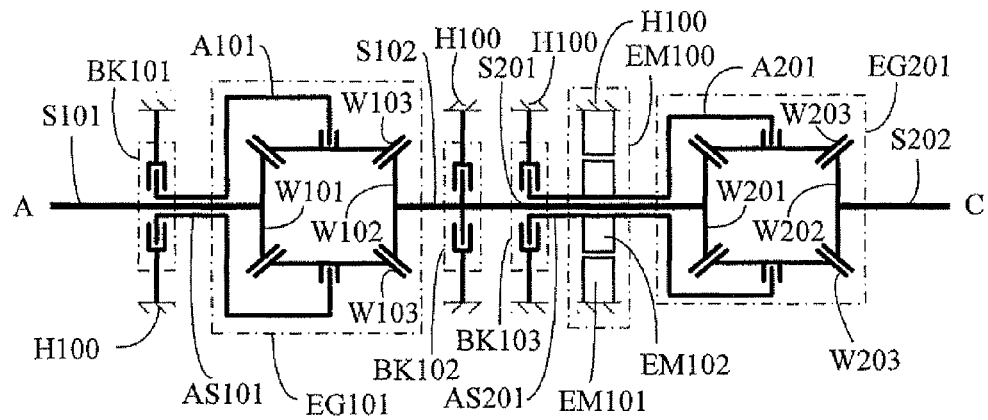
FIG. 15 is a schematic structural view showing the rotary part of electric machine (EM102) of the electric machine (EM100) directly is driving the rocker arm sleeve (AS201), according to the present invention.
Figure 16:
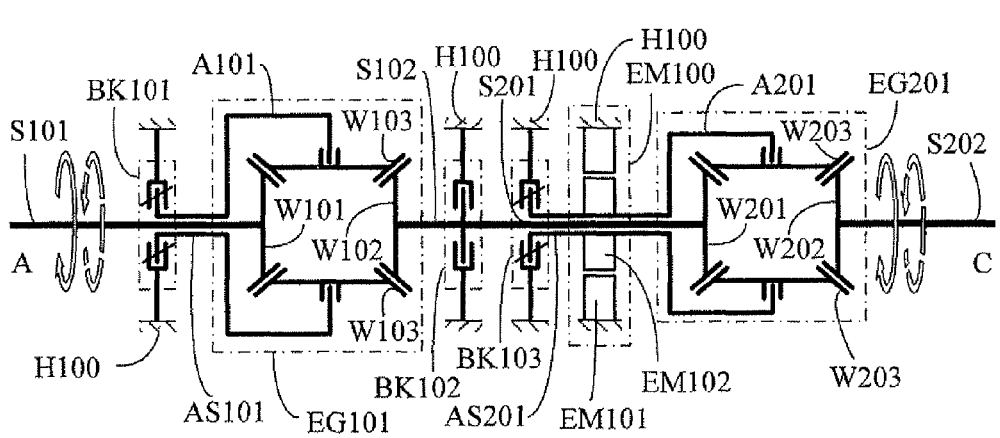
FIG. 16 is a schematic view showing the operation state wherein the rotary kinetic energy is inputted from the first rotary kinetic energy source (A) for driving the carrier (C), according to the present invention.
Figure 17:
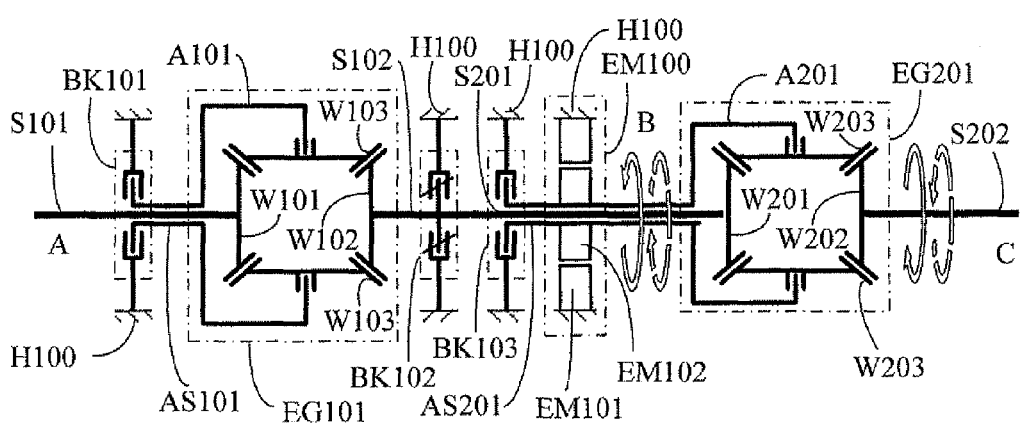
FIG. 17 is a schematic view showing the operation state wherein the rotary kinetic energy is generated by the rotary part of electric machine (EM102) of the electric machine (EM100) serving as the second rotary kinetic energy source (B) for driving the carrier (C), according to the present invention.
Figure 18:
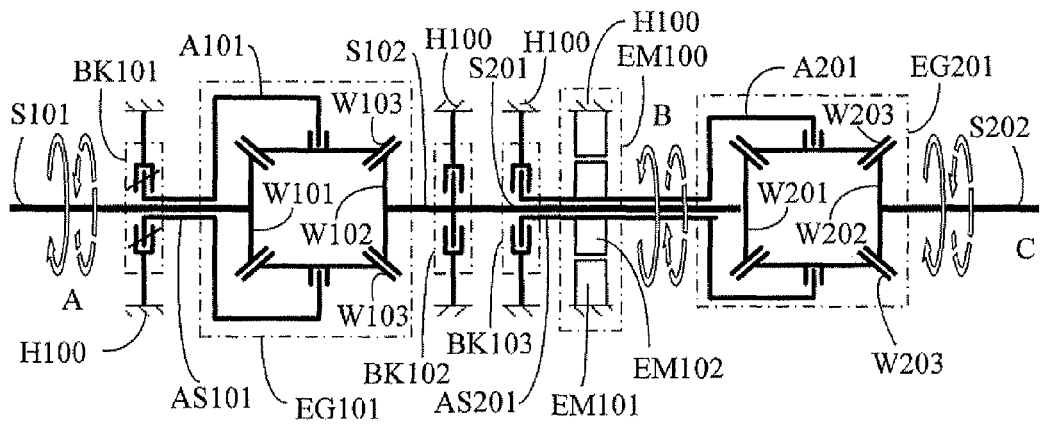
FIG. 18 is a schematic view showing the operation state wherein the rotary kinetic energy is inputted by the first rotary kinetic energy source (A) for driving the rotary part of electric machine (EM102) of the electric machine (EM100) and the carrier (C), according to the present invention.
Figure 19:
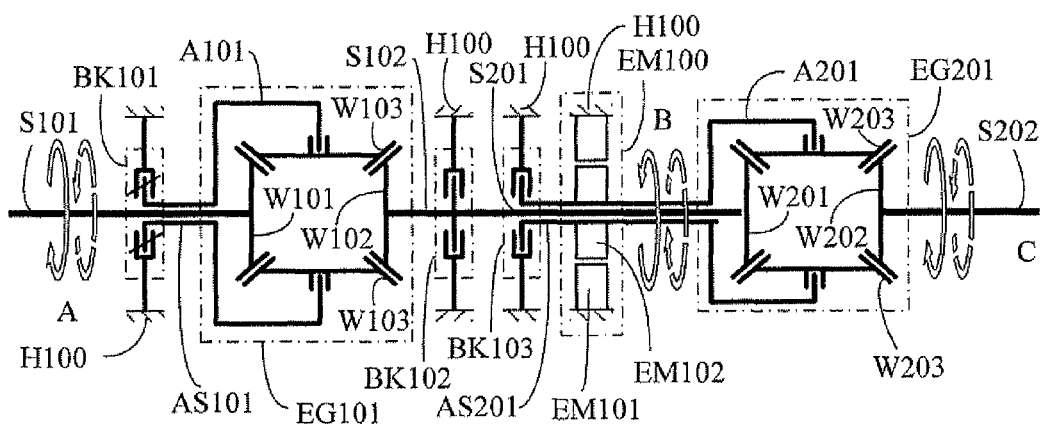
FIG. 19 is a schematic view showing the operation state wherein the rotary kinetic energy is jointly inputted from the first rotary kinetic energy source (A) and the rotary part of electric machine (EM102) of the electric machine (EM100) for driving the carrier (C), according to the present invention.
Figure 20:
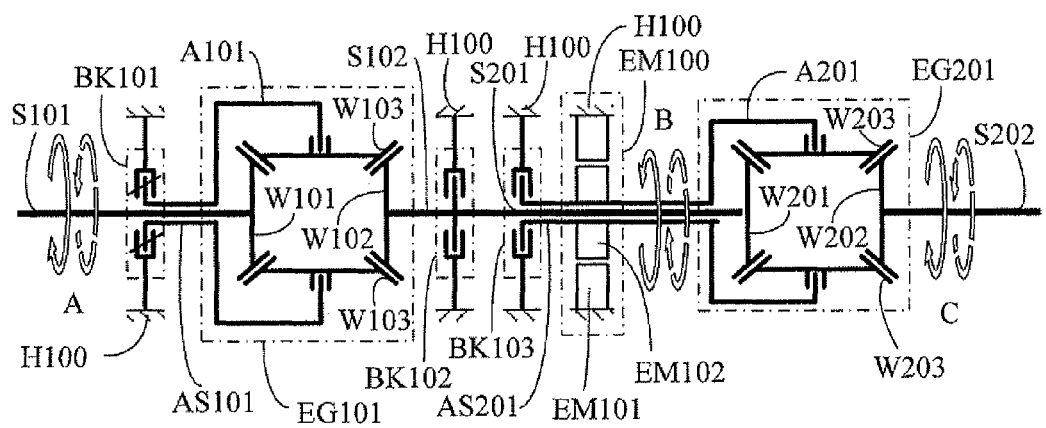
FIG. 20 is a schematic view showing the operation state wherein the rotary kinetic energy generated by the rotary part of electric machine (EM102) of the electric machine (EM100) serving as the second rotary kinetic energy source (B) drives the first rotary kinetic energy source (A) and the carrier (C), according to the present invention.
Figure 21:
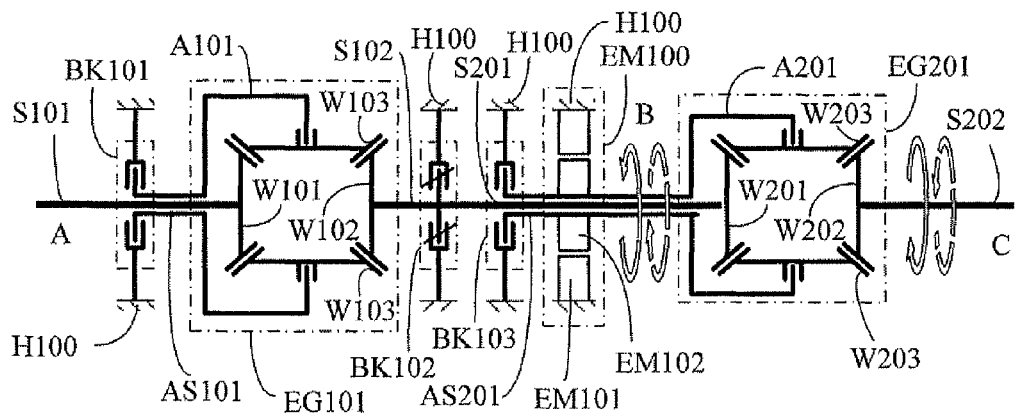
FIG. 21 is a schematic view showing the operation state wherein the rotary kinetic energy is reversely inputted from the carrier (C) for driving the rotary part of electric machine (EM102) of the electric machine (EM100), according to the present invention.
Figure 22:
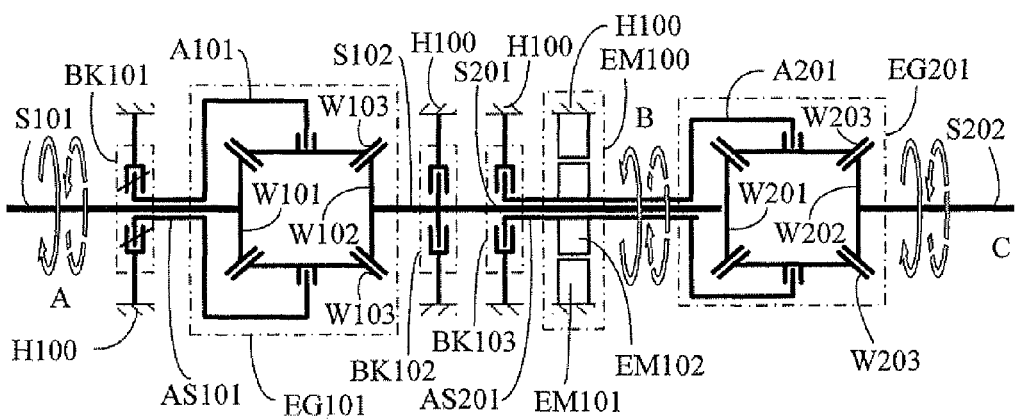
FIG. 22 is a schematic view showing the operation state wherein the rotary kinetic energy is reversely inputted from the carrier (C) for driving the first rotary kinetic energy source (A) and the rotary part of electric machine (EM102) of the electric machine (EM100), according to the present invention.
Figure 23:
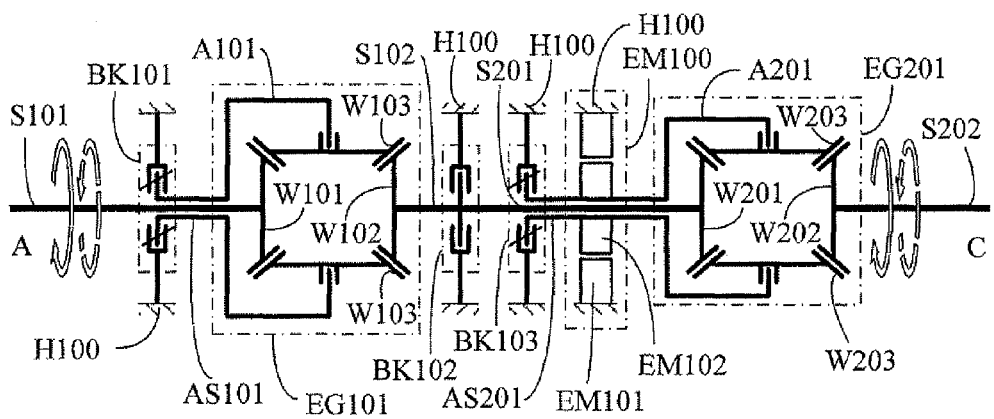
FIG. 23 is a schematic view showing the operation state wherein the rotary kinetic energy is reversely inputted from the carrier (C) for driving the first rotary kinetic energy source (A), according to the present invention.
Figure 24:
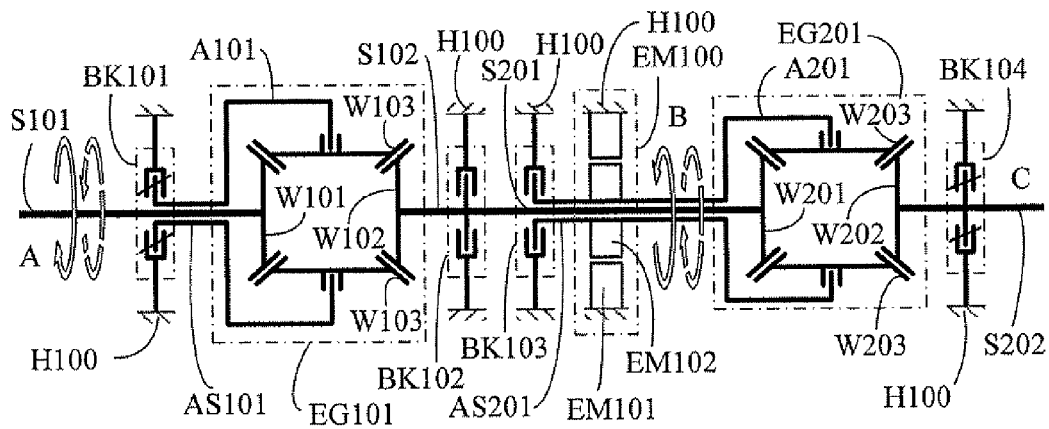
FIG. 24 is a schematic view showing the operation state wherein the rotation shaft (S202) at the output end of the second epicycle gear set (EG201) is further installed with a controllable brake device (BK104), and the rotary kinetic energy generated by the rotary part of electric machine (EM102) of the electric machine (EM100) serving as the second rotary kinetic energy source (B) drives the first rotary kinetic energy source (A), according to the present invention.
Figure 25:
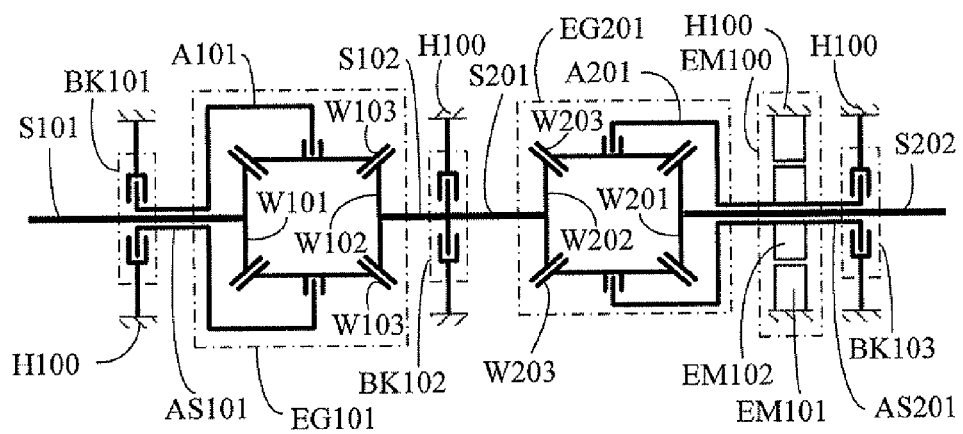
FIG. 25 is a schematic view showing that the rotary part of electric machine (EM102) of the electric machine (EM100) and the rocker arm sleeve (AS201), the rocker arm (A201) and the controllable brake device (BK103) are installed at the output end of the second epicycle gear set (EG201), according to the present invention.
Figure 26:
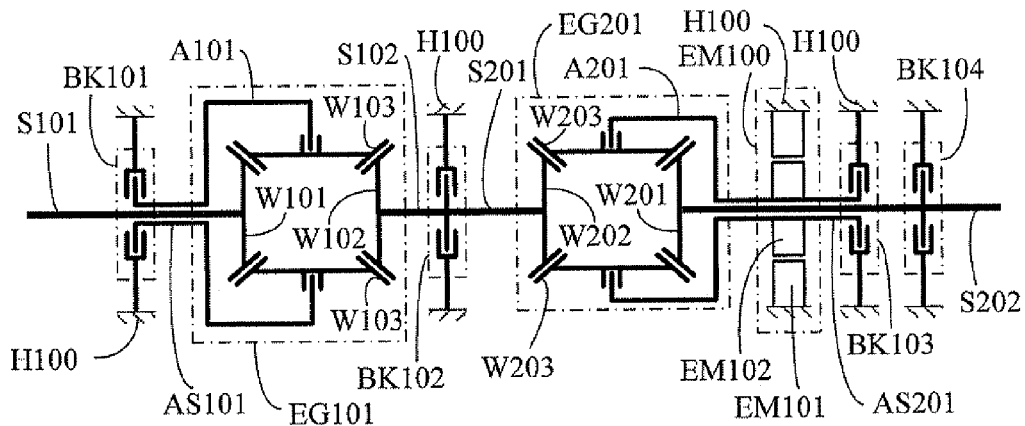
FIG. 26 is a schematic view showing the operation state wherein the rotation shaft (S202) at the output end of the second epicycle gear set (EG201) shown in FIG. 25 is further installed with a controllable brake device (BK104), and the rotary kinetic energy generated by the rotary part of electric machine (EM102) of the electric machine (EM100) serving as the second rotary kinetic energy source (B) drives the first rotary kinetic energy source (A), according to the present invention.

According to the present invention of the dual power driving system with epicycle gear sets transmitted in series, the rotary part of electric machine (EM102) of the electric machine (EM100) can directly drive the rocker arm sleeve (AS201), so the transmission wheel (W200), the transmission wheel (W100) and the rotation shaft (S100) are not provided for reducing the occupied space;

FIG. 15 is a schematic structural view showing the rotary part of electric machine (EM102) of the electric machine (EM100) directly driving the rocker arm sleeve (AS201), according to the present invention;

As shown in FIG. 15, it mainly consists of:

First epicycle gear set (EG101): a transmission wheel (W101) at the input end, an epicycle wheel (W103), a transmission wheel (W102) at the output end are served to constitute the first epicycle gear set (EG101), wherein the mentioned wheels are gears or friction wheels; a rotating shaft (S101) is installed at the input end, one end of the rotating shaft (S101) is driven by the first rotary kinetic energy source (A), the other end thereof is connected to the transmission wheel (W101) at the input end, and a rotating shaft (S102) is installed at the output end for connecting to the transmission wheel (W102) at the output end, and one or more than one of epicycle wheels (W103) are installed between the transmission wheel (W101) and the transmission wheel (W102), the epicycle wheel (W103) is equipped with a rocker arm (A101) and a rocker arm sleeve (AS101), the rocker arm sleeve (AS101) is served to shaft-installed on both or at least one of the rotating shafts (S101, S102) and capable of performing relative rotation; a controllable brake device (BK101) is installed between the rocker arm (A101) and the rocker arm sleeve (AS101) and a housing (H100);

Second epicycle gear set (EG201): a transmission wheel (W201) at the input end, an epicycle wheel (W203), a transmission wheel (W202) at the output end are served to constitute the second epicycle gear set (E0201), wherein the mentioned wheels are gears or friction wheels; a rotating shaft (S201) is installed at the input end, one end of the rotating shaft (S201) is connected to the rotating shaft (S102) at the output end of the first epicycle gear set (EG101) for transmission, the other end thereof is connected to the transmission wheel (W201) at the input end, and a rotating shaft (S202) is installed at the output end, one end of the rotating shaft (S202) is connected to the transmission wheel (W202) at the output end, the other end thereof is connected to a carrier (C), one or more than one of epicycle wheels (W203) are installed between the transmission wheel (W201) and the transmission wheel (W202), the epicycle wheel (W203) is equipped with a rocker arm (A201) and a rocker arm sleeve (AS201), the rocker arm sleeve (AS201) is shaft-installed on both or at least one of the rotating shafts (S201, 5202) and capable of performing relative rotation, the rocker arm sleeve (AS201) is connected to the rotary part of electric machine (EM102) of the electric machine (EM100) serving as the second rotary kinetic energy source (B) for mutually driving; a controllable brake device (BK103) is installed between the rocker arm (A201) and the rocker arm sleeve (AS201) and the housing (H100), and a controllable brake device (BK102) is installed between the rotating shaft (S201) and the housing (H100);

Controllable brake device (BK101), (BK102), (BK103): constituted by a brake device driven through manual force, mechanical force, pneumatic force, hydraulic force or electromagnetic effect, for being controlled to perform operations of engagement braking or releasing, and the operation means can be engagement braking in a normal state and be releasing in an input control state, or can be releasing in the normal state and be engagement braking in the input control state;

Electric machine (EM100): constituted by a rotary electric machine, including DC or AC, synchronous or asynchronous, brush or brushless, coiled excitation or permanent magnet pole rotary electric machines, mainly served as motor operation function and also capable of being served as power generator function for reversely inputting the rotary kinetic energy to be served as the second rotary kinetic energy source (B);

Housing (H100): constituted by a static housing for accommodating the first epicycle gear set (EG101), the second epicycle gear set (EG201), the controllable brake device (BK101), the controllable brake device (BK102) and the controllable brake device (BK103), and is connected to the first rotary kinetic energy source (A), the static part of electric machine (EM101) of the electric machine (EM100) serving as the second rotary kinetic energy source (B) and the carrier (C);

The rotating shaft (S101) at the input end of the first epicycle gear set (EG101) is connected to the first rotary kinetic energy source (A);

The rotating shaft (S202) at the output end of the second epicycle gear set (EG201) is connected to the carrier (C);

the rotary part of electric machine (EM102) of the electric machine (EM100) serving as the second rotary kinetic energy source (B) is connected to the rocker arm (A201) and the rocker arm sleeve (AS201) of the second epicycle gear set (EG201), the static part of electric machine (EM101) of the electric machine (EM100) is fastened and connected with the housing (H100);

The epicycle wheel (W103) of the first epicycle gear set (EG101) is shaft-installed to both or at least one of the rotating shafts (S101), (S102) through the rocker arm (A101) and the rocker arm sleeve (AS101), and capable of rotating along the rotating shaft;

The controllable brake device (BK101) is installed between the rocker arm sleeve (AS101) and the rocker arm (A101) of the first epicycle gear set (EG101) and the housing (H100);

The rotating shaft (S102) at the output end of the first epicycle gear set (EG101) and the rotating shaft (S201) at the input end of the second epicycle gear set (EG201) are connected for transmission;

The controllable brake device (BK102) is installed between the rotating shaft (S201) and the housing (H100);

The epicycle wheel (W203) of the second epicycle gear set (EG201) is sleeved to both or at least one of the rotating shafts (S201), (S202) through the rocker arm (A201) and the rocker arm sleeve (AS201), and capable of rotating along the rotating shaft;

The controllable brake device (BK103) is installed between the rocker arm sleeve (AS201) and the rocker arm (A201) of the second epicycle gear set (EG201) and the housing (H100); the rocker arm sleeve (AS201) and the rocker arm (A201) are connected to the rotary part of electric machine (EM102) of the electric machine (EM100);

According to the present invention, the operation functions of the dual power driving system with epicycle gear sets transmitted in series has one or more than one of the followings:

(1) The controllable brake devices (BK101), (BK103) are in the engagement braking state; the first rotary kinetic energy source (A) inputs the rotary kinetic energy for driving the rotating shaft (S101), and then the rotary kinetic energy is transmitted through the rotating shaft (S102) at the output end of the first epicycle gear set (EG101) and the connected rotating shaft (S201) at the input end of the second epicycle gear set (EG201), and further through the rotating shaft (S202) at the output end of the second epicycle gear set (EG201) so as to drive the carrier (C); FIG. 16 is a schematic view showing the operation state wherein the rotary kinetic energy is inputted from the first rotary kinetic energy source (A) for driving the carrier (C);

(2) The controllable brake device (BK102) is in the engagement braking state; the electric machine (EM100) serving as the second rotary kinetic energy source (B) transmits electricity to the rotary part of electric machine (EM102) to generate the rotary kinetic energy for driving the rocker arm sleeve (AS201) and the rocker arm (A201) to allow the epicycle wheel (W203) to epicycle on the transmission wheel (W201), and meanwhile to drive the transmission wheel (W202) and the rotating shaft (S202) at the output end so as to drive the carrier (C); FIG. 17 is a schematic view showing the operation state wherein the rotary kinetic energy is generated by the rotary part of electric machine (EM102) of the electric machine (EM100) serving as the second rotary kinetic energy source (B) for driving the carrier (C), according to the present invention;

(3) The controllable brake device (BK101) is in the engagement braking state; the first rotary kinetic energy source (A) inputs the rotary kinetic energy for driving the rotating shaft (S101), and then the rotary kinetic energy is transmitted through the rotating shaft (S102) at the output end of the first epicycle gear set (EG101) and the connected rotating shaft (S201) at the input end of the second epicycle gear set (EG201), and further through the rotating shaft (S202) at the output end of the second epicycle gear set (EG201) to drive the carrier (C), and meanwhile through the epicycle wheel (W203) of the second epicycle gear set (EG201) and the rocker arm (A201) and the rocker arm sleeve (AS201) for driving the rotary part of electric machine (EM102) of the electric machine (EM100); FIG. 18 is a schematic view showing the operation state wherein the rotary kinetic energy is inputted by the first rotary kinetic energy source (A) for driving the rotary part of electric machine (EM102) of the electric machine (EM100) and the carrier (C), according to the present invention;

(4) The controllable brake device (BK101) is in the engagement braking state; the first rotary kinetic energy source (A) inputs the rotary kinetic energy for driving the rotating shaft (S101), and then the rotary kinetic energy is transmitted through the rotating shaft (S102) at the output end of the first epicycle gear set (EG101) and the connected rotating shaft (S201) at the input end of the second epicycle gear set (EG201), and further through the rotating shaft (S202) at the output end of the second epicycle gear set (EG201) to drive the carrier (C), and meanwhile the rotary part of electric machine (EM102) of the electric machine (EM100) serving as the second rotary kinetic energy source (B) inputs the rotary kinetic energy for driving the rocker arm sleeve (AS201) and the rocker arm (A201) to allow the epicycle wheel (W203) to epicycle on the transmission wheel (W201), so as to drive the transmission wheel (W202) and the rotating shaft (S202) at the same time, and thereby together with the rotary kinetic energy of the first rotary kinetic energy source (A) to drive the carrier (C); FIG. 19 is a schematic view showing the operation state wherein the rotary kinetic energy is jointly inputted from the first rotary kinetic energy source (A) and the rotary part of electric machine (EM102) of the electric machine (EM100) for driving the carrier (C), according to the present invention;

(5) The controllable brake device (BK101) is in the engagement braking state; the rotary part of electric machine (EM102) of the electric machine (EM100) serving as the second rotary kinetic energy source (B) generates the rotary kinetic energy for driving the rocker arm sleeve (AS201) and the rocker arm (A201) so that the epicycle wheel (W203) is linked to drive the transmission wheel (W202), and thereby through the transmission wheel (W202) to drive the carrier (C), and meanwhile the epicycle wheel (W203) drives the transmission wheel (W201), and through the rotating shaft (S201) and the rotating shaft (S102) and through the transmission wheel (W102) and the epicycle wheel (W103) of the first epicycle gear set (EG101) to drive the transmission wheel (W101) and the rotating shaft (S101), and thereby further to drive the first rotary kinetic energy source (A); FIG. 20 is a schematic view showing the operation state wherein the rotary kinetic energy generated by the rotary part of electric machine (EM102) of the electric machine (EM100) serving as the second rotary kinetic energy source (B) drives the first rotary kinetic energy source (A) and the carrier (C), according to the present invention;

(6) The controllable brake device (BK102) is in the engagement braking state; the carrier (C) reversely inputs the rotary kinetic energy for driving the transmission wheel (W202) of the second epicycle gear set (EG201) through the rotating shaft (S202), so as to drive the epicycle wheel (W203) and the rocker arm (A201) and the rocker arm sleeve (AS201) thereby to drive the rotary part of electric machine (EM102) of the electric machine (EM100); FIG. 21 is a schematic view showing the operation state wherein the rotary kinetic energy is reversely inputted from the carrier (C) for driving the rotary part of electric machine (EM102) of the electric machine (EM100), according to the present invention;

(7) The controllable brake device (BK101) is in the engagement braking state; the carrier (C) reversely inputs the rotary kinetic energy for driving the transmission wheel (W202) of the second epicycle gear set (EG201) through the rotating shaft (S202), so as to drive the epicycle wheel (W203) and the rocker arm (A201) and the rocker arm sleeve (AS201) thereby to drive the rotary part of electric machine (EM102) of the electric machine (EM100); meanwhile the epicycle wheel (W203) drives the transmission wheel (W201) so as to drive the rotating shaft (S201) and the rotating shaft (S102), thereby through the transmission wheel (W102), the epicycle wheel (W103), the transmission wheel (W101) of the first epicycle gear set (EG101) to drive the rotating shaft (S101), and further to drive the first rotary kinetic energy source (A) at the same time; FIG. 22 is a schematic view showing the operation state wherein the rotary kinetic energy is reversely inputted from the carrier (C) for driving the first rotary kinetic energy source (A) and the rotary part of electric machine (EM102) of the electric machine (EM100), according to the present invention;

(8) The controllable brake devices (BK101), (BK103) are in the engagement braking state; the carrier (C) reversely inputs the rotary kinetic energy for driving the transmission wheel (W202) of the second epicycle gear set (EG201) through the rotating shaft (S202), and then the rotary kinetic energy is transmitted through the epicycle wheel (W203) to drive the transmission wheel (W201), so as to drive the rotating shaft (S201) and the rotating shaft (S102), and further through the transmission wheel (W102) and the epicycle wheel (W103) of the first epicycle gear set (EG101) to drive the transmission wheel (W101), so as to drive the rotating shaft (S101) to further drive the first rotary kinetic energy source (A); FIG. 23 is a schematic view showing the operation state wherein the rotary kinetic energy is reversely inputted from the carrier (C) for driving the first rotary kinetic energy source (A);

According to the dual power driving system with epicycle gear sets transmitted in series shown in FIG. 15, FIG. 24 is a schematic view showing the operation state wherein the rotating shaft (S202) at the output end of the second epicycle gear set (EG201) is further installed with a controllable brake device (BK104), and the rotary kinetic energy generated by the rotary part of electric machine (EM102) of the electric machine (EM100) serving as the second rotary kinetic energy source (B) drives the first rotary kinetic energy source (A), according to the present invention, in which a controllable brake device (BK104) is further installed between the rotating shaft (S202) at the output end of the second epicycle gear set (EG201) and the housing (H100) for fastening the rotating shaft (S202), so when the controllable brake device (BK103) is in the releasing state, the rotary part of electric machine (EM102) of the electric machine (EM100) serving as the second rotary kinetic energy source (B) inputs the rotary kinetic energy for driving the rocker arm sleeve (AS201) and the rocker arm (A201), so as to link the epicycle wheel (W203) to drive the transmission wheel (W201), and then the rotary kinetic energy is transmitted through the rotating shaft (S201) and the rotating shaft (S102) and the transmission wheel (W102) and the epicycle wheel (W103) of the first epicycle gear set (EG101) to drive the transmission wheel (W101) and the rotating shaft (S101), and thereby to drive the first rotary kinetic energy source (A) at the same time;

According to the dual power driving system with epicycle gear sets transmitted in series shown in FIG. 15, FIG. 25 is a schematic view showing that the rotary part of electric machine (EM102) of the electric machine (EM100) and the rocker arm sleeve (AS201), the rocker arm (A201) and the controllable brake device (BK103) are installed at the output end of the second epicycle gear set (EG201), according to the present invention, in which the rocker arm sleeve (AS201), the rocker arm (A201) of the second epicycle gear set (EG201), the controllable brake device (BK103) and the rotary part of electric machine (EM102) of the electric machine (EM100) are installed on the rotating shaft (S202) at the output end of the second epicycle gear set (EG201);

According to the dual power driving system with epicycle gear sets transmitted in series shown in FIG. 25, FIG. 26 is a schematic view showing the operation state wherein the rotating shaft (S202) at the output end of the second epicycle gear set (EG201) shown in FIG. 25 is further installed with a controllable brake device (BK104), and the rotary kinetic energy generated by the rotary part of electric machine (EM102) of the electric machine (EM100) serving as the second rotary kinetic energy source (B) drives the first rotary kinetic energy source (A), according to the present invention; a controllable brake device (BK104) is further installed between the rotating shaft (S202) at the output end of the second epicycle gear set (EG201) and the housing (H100), and through controlling the controllable brake device (BK103) installed between the rocker arm sleeve (AS201) and the housing (H100) to be released, the controllable brake device (BK104) can be controlled to perform engagement braking, so the rotary part of electric machine (EM102) of the electric machine (EM100) drives the rocker arm (A201) to link the epicycle wheel (W203) for driving the transmission wheel (W201), and through the rotating shaft (S201) and the rotating shaft (S102) and through the transmission wheel (W102) and the epicycle wheel (W103) of the first epicycle gear set (EG101), the transmission wheel (W101) and the rotating shaft (S101) are driven, thereby driving the first rotary kinetic energy source (A) at the same time; or through controlling the controllable brake device (BK103) being in the engagement braking state, the controllable brake device (BK104), the controllable brake device (BK102) and the controllable brake device (BK101) are released, and the rotating shaft (S101) mutually transmits with the rotating shaft (S201).

Figure 27:
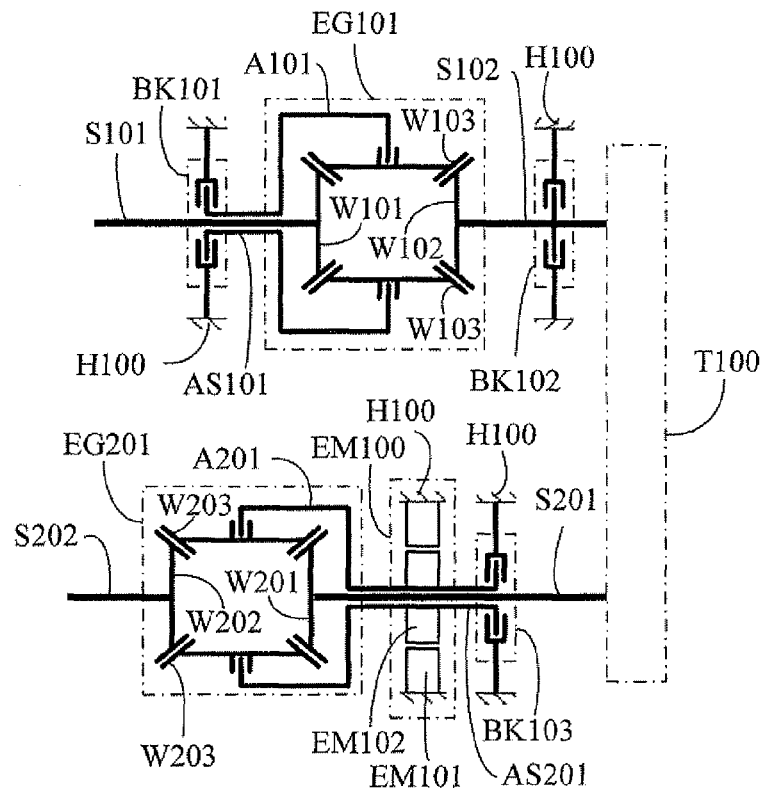
FIG. 27 is a schematic view showing that the first epicycle gear set (EG101) and the second epicycle gear set (EG201) are installed in parallel, and the transmission device (T100) is installed between the rotation shaft (S102) and the rotation shaft (S201), according to the present invention.
Figure 28:
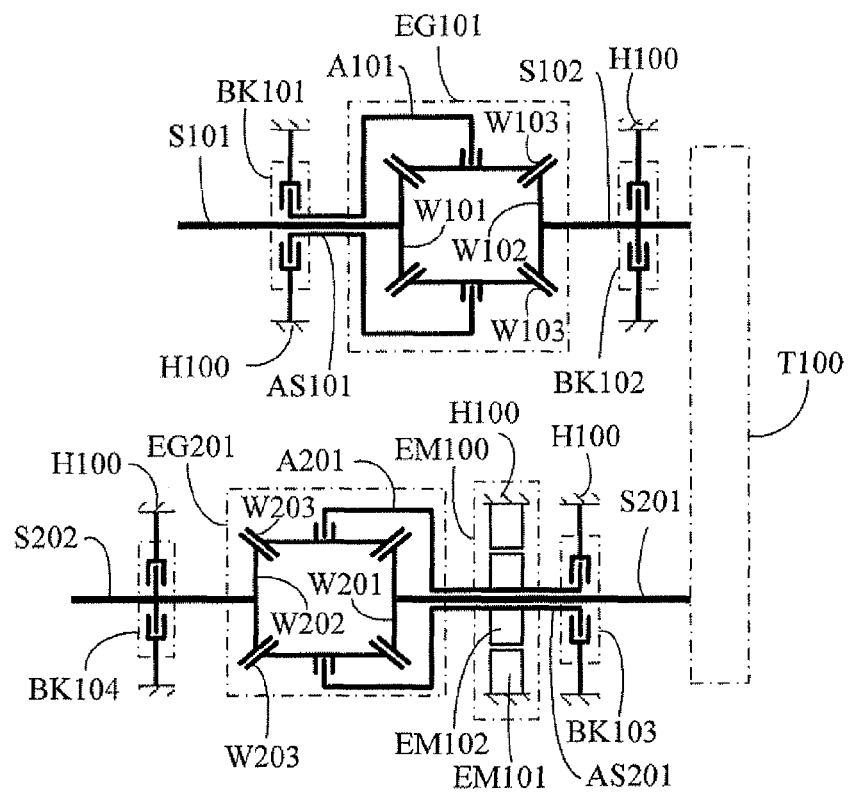
FIG. 28 is a schematic view showing the operation state wherein the rotation shaft (S202) at the output end of the second epicycle gear set (EG201) shown in FIG. 27 is further installed with a controllable brake device (BK104), and the rotary kinetic energy serving as the second rotary kinetic energy source (B) drives the first rotary kinetic energy source (A), according to the present invention.

According to the dual power driving system with epicycle gear sets transmitted in series shown in FIG. 15, FIG. 27 is a schematic view showing that the first epicycle gear set (EG101) and the second epicycle gear set (EG201) are installed in parallel, and the transmission device (T100) is installed between the rotating shaft (S102) and the rotating shaft (S201), according to the present invention, in which the first epicycle gear set (EG101) and the second epicycle gear set (EG201) are arranged in parallel, and the transmission device (T100) is served to transmit in series, wherein the rotating shaft (S101) at the input end of the first epicycle gear set (EG101) is driven by the first rotary kinetic energy source (A), and the controllable brake device (BK101) is installed between the rotating shaft (S101) and the housing (H100);

The transmission device (T100) is installed between the rotating shaft (S102) and the rotating shaft (S201) at the input end of the second epicycle gear set (EG201), the controllable brake device (BK103) is installed between the rocker arm sleeve (AS201) and the housing (H100), and the rotating shaft (S202) at the output end of the second epicycle gear set (EG201) is served to drive the carrier (C);

Transmission device (T100) is constituted by the transmission device including automatic transmission, manumatic transmission, semi-automatic transmission, or manual transmission with fixed speed ratio or variable speed ratio, which is structured by the transmission wheel train, or planetary transmission wheel train, or the epicycle wheel train, or the CVT, or the liquid force transmission device, which is composed of gears, friction wheels, belts and pulleys, chains and chain wheels;

The epicycle wheel (W203) of the second epicycle gear set (EG201) is connected to the rocker arm (A201) and the rocker arm sleeve (AS201) and the rotary part of electric machine (EM102) of the electric machine (EM100);

The controllable brake device (BK102) is installed between the rotating shaft (S102) at the output end of the first epicycle gear set (EG101) and the housing (H100), and the controllable brake device (BK102) can also be installed on the rotating shaft (S201) at the input end of the second epicycle gear set (EG201);

According to the dual power driving system with epicycle gear sets transmitted in series, FIG. 28 is a schematic view showing the operation state wherein the rotating shaft (S202) at the output end of the second epicycle gear set (EG201) shown in FIG. 27 is further installed with a controllable brake device (BK104), and the rotary kinetic energy serving as the second rotary kinetic energy source (B) drives the first rotary kinetic energy source (A); the controllable brake device (BK104) is installed on the rotating shaft (S202) at the output end of the second epicycle gear set (EG201) for fastening the rotating shaft (S202), so when the controllable brake device (BK103) is in the releasing state, the rotary part of electric machine (EM102) of the electric machine (EM100) serving as the second rotary kinetic energy source (B) inputs the rotary kinetic energy for driving the rocker arm sleeve (AS201) and rotationally driving the rocker arm (A201), so as to link the epicycle wheel (W203) to drive the transmission wheel (W201), and then transmitted through the rotating shaft (S201) and the transmission device (T100) and the rotating shaft (S102) and further through the transmission wheel (W102) and the epicycle wheel (W103) of the first epicycle gear set (EG101) to drive the transmission wheel (W101) and the rotating shaft (S101) and thereby to drive the first rotary kinetic energy source (A) at the same time; or the rotating shaft (S101) inputs the rotary kinetic energy for driving the second rotary kinetic energy source (B) and the carrier (C);

In the dual power driving system with epicycle gear sets transmitted in series shown in FIG. 15, the controllable braked device (BK103) is used for controlling the rotary part of electric machine (EM102) of the electric machine (EM100) serving as the second rotary kinetic energy source (B) and controlling the transmission chain between and the rocker arm (A201) and the epicycle wheel (W203) of the second epicycle gear set (EG201) to perform engagement braking or rotational driving, wherein the installation location of the controllable brake device (BK103) is between the rotary end of the rotary part of electric machine (EM102) of the electric machine (EM100) and the housing (H100), or between the rotating shaft (S100), the transmission device (T200), the rocker arm (A201) of the rotary components of the mentioned transmission chain and the housing (H100).

When the dual power driving system with epicycle gear sets transmitted in series shown in FIG. 15 is in practical application, the first rotary kinetic energy source (A), the electric machine (EM100) serving as the second rotary kinetic energy source (B), the carrier (C), the first epicycle gear set (EG101), the second epicycle gear set (EG201) and each set of controllable brake device can be installed in the housing (H100) integrally formed or assembled as one unit, or installed in two or more than two of individual housings.

The invention claimed is:

1. A dual power driving system having two epicyclic gear sets, comprising:
    a first epicyclic gear set (EG101) including:
        a first input transmission wheel (W101) connected to a first rotating input shaft (S101) driven by a first rotary kinetic energy source (A);
        a first output transmission wheel (W102) connected to a first rotating output shaft (S102); and
        at least one first epicyclic wheel (W103) coupled between the first input transmission wheel (W101) and the first output transmission wheel (W102), wherein:
            the at least one first epicyclic wheel (W103) is rotatably mounted on a first rocker arm (A101),
            the first rocker arm (A101) has a first rocker arm sleeve (AS101) that surrounds and is rotatable relative to at least one of said first rotating input shaft (S101) and said first rotating output shaft (S102), and
            a first controllable brake device (BK101) is installed between the first rocker arm sleeve (AS101) and a housing (H100);
    a second epicyclic gear set (EG201) including:
        a second input transmission wheel (W201) connected to a first end of a second rotating input shaft (S201), a second end of the second rotating input shaft (S201) being connected to an end of first rotating output shaft (S102);
        a second output transmission wheel (W202) connected to a second rotating output shaft (S202) for driving a carrier (C);
        at least one second epicyclic wheel (W203) coupled between the second input transmission wheel (W201) and the second output transmission wheel (W202), wherein:
            the at least one second epicyclic wheel (W203) is rotatably mounted on a second rocker arm (A201),
            the second rocker arm (A201) has a second rocker arm sleeve (AS201) that surrounds and is rotatable relative to at least one of said second rotating input shaft (S201) and said second rotating output shaft (S202),
a second controllable brake device (BK102) is installed between the second rotating input shaft (S201) and the housing (H100); and
at least one of a transmission device (T200) and an electric machine (EM100) coupled to the second rocker arm sleeve (AS201),
said transmission device (T200) having a first transmission wheel (W100) driven by a second rotary kinetic energy source (B) and a second transmission wheel (W200) connected to the second rocker arm sleeve (AS201) of the second epicyclic gear set (EG201), said first and second transmission wheels (W100,W200) transmitting rotary kinetic energy from the second rotary kinetic energy source (B) to the second epicyclic gear set (EG201) via the second rocker arm (A201), and
said electric machine (EM100) including a static part (EM101) and a rotary part (EM102), the static part (EM101) being connected to the housing (H100) and the rotary part (EM102) being connected to the second rocker arm sleeve (AS201) of the second epicyclic gear set (EG201), said electric machine (EM100) having a motor function in which said static part (EM101) serves as the second rotary kinetic energy source (B) to the second epicyclic gear set (EG201), and said electric machine (EM100) also having a generator function when said rotary part (EM102) is rotated in response to reverse rotation of the second rocker arm (A201) and second rocker arm sleeve (AS201),
wherein a third controllable brake device (BK103) is installed between the housing (H100) and one of the second rocker arm (A201), the second rocker arm sleeve (AS201), and a component of transmission device (T200); and
wherein operation modes of said dual power driving system are controlled by selectively controlling said first, second, and third controllable brake devices (BK101, BK102,BK103) to selectively transmit power to said carrier (C) from one or both of said first rotary kinetic energy source (A) and said second rotary kinetic energy source (B) or electric machine (EM100) via one or both of said first and second epicyclic gear sets (EG101, EG201).

2. A dual power driving system as claimed in claim 1, wherein said transmission device (T200) is coupled to the second rocker arm sleeve (AS201), and operations of the dual power driving system include at least one of the following operations:

when the first and third controllable brake devices (BK101, BK103) respectively engage the first rocker arm sleeve (AS101) and the second rocker arm sleeve (AS201), rotary kinetic energy from the first rotary kinetic energy source (A) is transmitted from the first rotating input shaft (S101) to the first rotating output shaft (S102) via the first epicyclic gear set (EG101), and from the second rotating input shaft (S201) to the second rotating output shaft (S202) via the second epicyclic gear set to drive the carrier (C), wherein the first rotary kinetic energy source (A) drives the carrier (C)

when the second controllable brake device (BK102) engages the first rotating output shaft (S102) and the second rotary kinetic energy source (B) is driven to provide kinetic energy, rotary kinetic energy from the second rotary kinetic energy source (B) is transmitted via rotating shaft (S100) and transmission device (T200) to rocker arm (A201), which causes second epicyclic wheel (W203) to carry out an epicyclic motion and cause rotation of second output wheel (W202), thereby driving the second rotating output shaft (S202) and carrier (C), whereby the second rotary kinetic energy source (B) drives the carrier (C), when the first controllable brake device (BK101) engages the first rocker arm sleeve (AS101), the second and third controllable brake devices (BK102,BK103) are disengaged, and the first rotary kinetic energy source (A) is driven to provide kinetic energy, rotary kinetic energy from the first rotary kinetic energy source (A) is transmitted from the first rotating input shaft (S101) to the first rotating output shaft (S102) via the first epicyclic gear set (EG101), and from the second rotating input shaft (S201) to the second input wheel (W201) to cause epicyclic motion of the second epicyclic wheel (W203), said epicyclic motion of the second epicyclic wheel causing rotation of both the second output wheel (W202) and the second rocker arm (A201) to respectively drive said carrier (C) via said second rotating output shaft (S202) and said second rotary kinetic energy source (B) via the transmission device (T200) and first transmission shaft (S100), whereby said first rotary kinetic energy source (A) drives both said carrier (C) and said second rotary kinetic energy source (B), when the first controllable brake device (BK101) engages the first rocker arm sleeve (AS101), the second and third controllable brake devices (BK102,BK103) are disengaged, and said first and second rotary kinetic energy sources (A,B) are both driven to provide rotary kinetic energy, rotary kinetic energy from the first rotary kinetic energy source (A) is transmitted from the first rotating input shaft (S101) to the second input wheel (W201) and rotary kinetic energy from the second rotary kinetic energy source (B) is transmitted from the first transmission shaft (S100) to the rocker arm (A201), rotation of said second input wheel (W201) and said rocker arm (A201) together causing epicyclic motion of the second epicyclic wheel (W203), said epicyclic motion of the second epicyclic wheel causing rotation of the second output wheel (W202) to respectively drive said carrier (C), whereby said first and second rotary kinetic energy sources (A,B) jointly drive said carrier (C), when the first controllable brake device (BK101) engages the first rocker arm sleeve (AS101), the second and third controllable brake devices (BK102,BK103) are disengaged, and the second rotary kinetic energy source (B) is driven to provide kinetic energy, rotary kinetic energy from the second rotary kinetic energy source (B) is transmitted from the first transmission shaft (S100) to the second rocker arm (A201) to cause rotation of both the second input wheel (W201) and the second output wheel (W202) via epicyclic motion of the second epicyclic wheel (W203) to thereby transmit power to the first rotary kinetic energy source (A) via the first epicyclic gear set (EG101) and to the carrier (C) via the second rotating output shaft (S202), whereby said second rotary kinetic energy source (B) drives both said first rotary kinetic energy source (A) and said carrier (C), when the second controllable brake device (BK102) engages the first rotating output shaft (S102) and the carrier (C) reversely inputs rotary kinetic energy for driving the output wheel (W202) of the second epicyclic gear set (EG201) through the second rotating output shaft (S202), the rotary kinetic energy is transmitted to the second epicyclic wheel (W203) to cause rotation of the second rocker arm (A201) and thereby drive the second rotary energy source (B) via the transmission device (T200), whereby the reversely driven carrier (C) drives the second rotary energy source (B), when the first controllable brake device (BK101) engages the first rocker arm sleeve (AS101) and the carrier (C) reversely inputs rotary kinetic energy for driving the output wheel (W202) of the second epicyclic gear set (EG201) through the second rotating output shaft (S202), the rotary kinetic energy is transmitted to the second epicyclic wheel (W203) to cause rotation of both the second rocker arm (A201) and the second input wheel (W201) and thereby respectively drive the second rotary energy source (B) via the transmission device (T200) and the first rotary energy source (A) via the first epicyclic gear set (EG101), whereby the reversely driven carrier (C) drives both the first and second rotary energy sources (A,B), and when the first and third controllable brake devices (BK101, BK103) respectively engage the first rocker arm sleeve (AS101) and the second rocker arm sleeve (AS201) and the carrier (C) is reversely driven, rotary kinetic energy from the carrier (C) is transmitted to the first rotary kinetic energy source (A) through the second epicyclic gear set (EG201) and the first epicyclic gear set (EG101), wherein the reversely driven carrier (C) drives the first rotary energy source (A).

3. A dual power driving system having two epicyclic gear sets as claimed in claim 1, wherein said electric machine (EM100) is coupled to the second rocker arm sleeve (AS201).

4. A dual power driving system as claimed in claim 3, wherein when the first and third controllable brake devices (BK101,BK103) respectively engage the first rocker arm sleeve (AS101) and the second rocker arm sleeve (AS201), rotary kinetic energy from the first rotary kinetic energy source (A) is transmitted from the first rotating input shaft (S101) to the first rotating output shaft (S102) via the first epicyclic gear set (EG101), and from the second rotating input shaft (S201) to the second rotating output shaft (S202) via the second epicyclic gear set to drive the carrier (C), wherein the first rotary kinetic energy source (A) drives the carrier (C).

5. A dual power driving system as claimed in claim 3, wherein when the second controllable brake device (BK102) engages the first rotating output shaft (S102) and the rotary part (EM102) of the electrical machine (EM100) is driven by the static part (EM101) to provide rotary kinetic energy, rotary kinetic energy from the rotary part (EM102) is transmitted to rocker arm (A201), which causes second epicyclic wheel (W203) to carry out an epicyclic motion and cause rotation of second output wheel (W202), thereby driving the second rotating output shaft (S202) and carrier (C), whereby the electric machine (EM100) serving as a motor drives the carrier (C).

6. A dual power driving system as claimed in claim 3, wherein when the first controllable brake device (BK101) engages the first rocker arm sleeve (AS101), the second and third controllable brake devices (BK102,BK103) are disengaged, and the first rotary kinetic energy source (A) is driven to provide kinetic energy, rotary kinetic energy from the first rotary kinetic energy source (A) is transmitted from the first rotating input shaft (S101) to the first rotating output shaft (S102) via the first epicyclic gear set (EG101), and from the second rotating input shaft (S201) to the second input wheel (W201) to cause epicyclic motion of the second epicyclic wheel (W203), said epicyclic motion of the second epicyclic wheel causing rotation of both the second output wheel (W202) and the second rocker arm (A201) to respectively drive said carrier (C) via said second rotating output shaft (S202) and said rotary part (EM102) via the second rocker arm sleeve (AS201), whereby said first rotary kinetic energy source (A) drives both said carrier (C) and said rotary part (EM102), said electrical machine (EM100) thereby serving as a generator.

7. A dual power driving system as claimed in claim 3, wherein when the first controllable brake device (BK101) engages the first rocker arm sleeve (AS101), the second and third controllable brake devices (BK102,BK103) are disengaged, and said first rotary kinetic energy sources (A) and said electric machine (EM100) are both driven to provide rotary kinetic energy, rotary kinetic energy from the first rotary kinetic energy source (A) is transmitted from the first rotating input shaft (S101) to the second input wheel (W201) and rotary kinetic energy from electric machine (EM100) serving as the second rotary kinetic energy source (B) is transmitted from the rotary part (EM102) to the rocker arm (A201), rotation of said second input wheel (W201) and said rocker arm (A201) together causing epicyclic motion of the second epicyclic wheel (W203), said epicyclic motion of the second epicyclic wheel causing rotation of the second output wheel (W202) to respectively drive said carrier (C), whereby said first rotary kinetic energy sources (A) and said electric machine (EM100) serving as a motor jointly drive said carrier (C).

8. A dual power driving system as claimed in claim 3, wherein when the first controllable brake device (BK101) engages the first rocker arm sleeve (AS101), the second and third controllable brake devices (BK102,BK103) are disengaged, and the second rotary kinetic energy source (B) is driven to provide kinetic energy, rotary kinetic energy from the electric machine (EM100) serving as the second rotary kinetic energy source (B) is transmitted from the rotary part (EM102) to the second rocker arm (A201) to cause rotation of both the second input wheel (W201) and the second output wheel (W202) via epicyclic motion of the second epicyclic wheel (W203) to thereby transmit power to the first rotary kinetic energy source (A) via the first epicyclic gear set (EG101) and to the carrier (C) via the second rotating output shaft (S202), whereby said electrical machine (EM100) serving as a motor drives both said first rotary kinetic energy source (A) and said carrier (C).

9. A dual power driving system as claimed in claim 3, wherein when the second controllable brake device (BK102) engages the first rotating output shaft (S102) and the carrier (C) reversely inputs rotary kinetic energy for driving the output wheel (W202) of the second epicyclic gear set (EG201) through the second rotating output shaft (S202), the rotary kinetic energy is transmitted to the second epicyclic wheel (W203) to cause rotation of the second rocker arm (A201) and thereby drive the rotary part (EM102), whereby the reversely driven carrier (C) drives the electric machine (EM100) to function as a generator.

10. A dual power driving system as claimed in claim 3, wherein when the first controllable brake device (BK101) engages the first rocker arm sleeve (AS101) and the carrier (C) reversely inputs rotary kinetic energy for driving the output wheel (W202) of the second epicyclic gear set (EG201) through the second rotating output shaft (S202), the rotary kinetic energy is transmitted to the second epicyclic wheel (W203) to cause rotation of both the second rocker arm (A201) and the second input wheel (W201) and thereby respectively drive the rotary part (EM102) via the first rotary energy source (A) and the first epicyclic gear set (EG101), whereby the reversely driven carrier (C) drives both the first rotary energy sources (A) and the electric machine (EM100) serving as a generator.

11. A dual power driving system as claimed in claim 3, wherein when the first and third controllable brake devices (BK101,BK103) respectively engage the first rocker arm sleeve (AS101) and the second rocker arm sleeve (AS201) and the carrier (C) is reversely driven, rotary kinetic energy from the carrier (C) is transmitted to the first rotary kinetic energy source (A) through the second epicyclic gear set (EG102) and the first epicyclic gear set (EG101), wherein the reversely driven carrier (C) drives the first rotary energy source (A).

12. A dual power driving system as claimed in claim 3, further comprising a fourth controllable brake device (BK104) between the second rotating output shaft (S202) and the housing (H100) for engaging the second rotating output shaft (S202) and transmitting the rotary kinetic energy provided by the second rotary part (EM102) to the second rocker arm (A201), the second epicyclic wheel (W203), second input wheel (W201), the second input shaft (S201), the first output shaft (S102), the first epicyclic gear set (EG101), and the first rotary kinetic energy source (A), whereby the electric machine (EM100) serving as a motor drives the first rotary kinetic energy source (A).

13. A dual power driving system as claimed in claim 3, wherein said first output shaft (S102) is coupled to said second input shaft (S201) by a second transmission device (T100) and the second transmission device (T100) is one of an automatic transmission, a manumatic transmission, a semi-automatic transmission, and a manual transmission, includes at least one of a transmission wheel train, planetary transmission wheel train, epicyclic wheel train, continuously variable transmission (CVT), and liquid force transmission device, and further includes at least one of the following transmission component sets: gears, friction wheels, a belt and pulley, and a chain and chain wheel.

14. A dual power driving system as claimed in claim 3, wherein the first input transmission wheel (W101), the second input transmission wheel (W201), the first output transmission wheel (W102), the second output transmission wheel (W202), the at least one first epicyclic wheel (W103), and the at least one second epicyclic wheel (W203) each respectively includes one of a gear and a friction wheel.

15. A dual power driving system as claimed in claim 3, wherein the first, second, and third controllable brake devices (BK101, BK102, BK103) are each respectively driven by one of a manual force, a mechanical force, a pneumatic force, a hydraulic force, and an electromagnetic effect.

16. A dual power driving system as claimed in claim 3, wherein the first rotary kinetic energy source (A) includes at least one of an internal combustion engine, an external combustion engine, a turbine engine, a Sterling engine, a power generator, an electrical machine, a wind turbine, a liquid flow turbine, and a manually-driven device.

17. A dual power driving system as claimed in claim 3, wherein the carrier (C) includes one of a vehicle, a boat, a flying machine, agricultural machinery, engineering or industrial machinery, and energy equipment.

18. A dual power driving system as claimed in claim 3, wherein the second rocker arm sleeve (AS201) surrounds the second output shaft (S202).

19. A dual power driving system as claimed in claim 18, further comprising a fourth controllable brake device (BK104) between the second rotating output shaft (S202) and the housing (H100) for engaging the second rotating output shaft (S202) and transmitting the rotary kinetic energy provided by the second rotary part (EM102) to the second rocker arm (A201), the second epicyclic wheel (W203), second input wheel (W201), the second input shaft (S201), the first output shaft (S102), the first epicyclic gear set (EG101), and the first rotary kinetic energy source (A), whereby the electric machine (EM100) serving as a motor drives the first rotary kinetic energy source (A).

* * * * *